(12) United States Patent
Lee et al.

(10) Patent No.: US 11,259,047 B2
(45) Date of Patent: Feb. 22, 2022

(54) METHOD AND APPARATUS FOR PROCESSING VIDEO SIGNAL

(71) Applicant: KT CORPORATION, Gyeonggi-do (KR)

(72) Inventors: Bae Keun Lee, Seoul (KR); Joo Young Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/091,904

(22) PCT Filed: Apr. 4, 2017

(86) PCT No.: PCT/KR2017/003685
§ 371 (c)(1),
(2) Date: Oct. 5, 2018

(87) PCT Pub. No.: WO2017/176030
PCT Pub. Date: Oct. 12, 2017

(65) Prior Publication Data
US 2019/0116381 A1 Apr. 18, 2019

(30) Foreign Application Priority Data

Apr. 6, 2016 (KR) .......... 10-2016-0042095
Jun. 24, 2016 (KR) .......... 10-2016-0079635

(51) Int. Cl.
*H04N 19/597* (2014.01)
*H04N 19/159* (2014.01)
(Continued)

(52) U.S. Cl.
CPC ......... *H04N 19/597* (2014.11); *H04N 13/161* (2018.05); *H04N 19/105* (2014.11);
(Continued)

(58) Field of Classification Search
CPC .. H04N 19/597; H04N 19/105; H04N 19/176; H04N 19/159; H04N 19/119; H04N 13/161
(Continued)

(56) References Cited

U.S. PATENT DOCUMENTS 8,472,522 B2  6/2013  Matsuo et al.
9,154,796 B2  10/2015  Seregin et al.
(Continued)

FOREIGN PATENT DOCUMENTS

CN  102918844 A  2/2013
CN  103299639 A  9/2013
(Continued)

OTHER PUBLICATIONS

Shohei Matsuo et al., "Intra prediction with spatial gradient", Visual Communications and Image Processing 2009, Proc. of SPIE—IS&T Electronic Imaging, SPIE vol. 7257, 72571R, pp. 1-9.
(Continued)

*Primary Examiner* — On S Mung
(74) *Attorney, Agent, or Firm* — IP Legal Services, LLC

(57) ABSTRACT

A method for processing a video according to the present invention may comprise: generating a plurality of Most Probable Mode (MPM) candidates; determining whether there is an MPM candidate identical to an intra-prediction mode of a current block among the plurality of MPM candidates; obtaining the intra-prediction mode of the current block, based on a result of the determining; and performing an intra-prediction for the current block, based on the intra-prediction mode of the current block.

13 Claims, 22 Drawing Sheets

(51) Int. Cl.
| | |
|---|---|
| H04N 19/176 | (2014.01) |
| H04N 19/426 | (2014.01) |
| H04N 19/593 | (2014.01) |
| H04N 19/182 | (2014.01) |
| H04N 19/107 | (2014.01) |
| H04N 19/44 | (2014.01) |
| H04N 19/105 | (2014.01) |
| H04N 13/161 | (2018.01) |
| H04N 19/91 | (2014.01) |
| H04N 13/00 | (2018.01) |

(52) U.S. Cl.
CPC ......... *H04N 19/107* (2014.11); *H04N 19/159* (2014.11); *H04N 19/176* (2014.11); *H04N 19/182* (2014.11); *H04N 19/426* (2014.11); *H04N 19/44* (2014.11); *H04N 19/593* (2014.11); *H04N 19/91* (2014.11); *H04N 2013/0085* (2013.01)

(58) Field of Classification Search
USPC ................................................ 375/240.12
See application file for complete search history.

(56) References Cited

U.S. PATENT DOCUMENTS

| | | | |
|---|---|---|---|
| 2010/0027655 A1 | 2/2010 | Matsuo et al. | |
| 2011/0292994 A1* | 12/2011 | Lim ..................... | H04N 19/182 375/240.02 |
| 2013/0114707 A1 | 5/2013 | Seregin et al. | |
| 2013/0128964 A1 | 5/2013 | Chien et al. | |
| 2013/0136175 A1 | 5/2013 | Wang et al. | |
| 2013/0287094 A1 | 10/2013 | Song et al. | |
| 2014/0233644 A1* | 8/2014 | Lee ..................... | H04N 19/176 375/240.12 |
| 2015/0010054 A1 | 1/2015 | Francois et al. | |
| 2015/0078438 A1 | 3/2015 | Lim et al. | |
| 2016/0330454 A1 | 11/2016 | Lim et al. | |
| 2017/0272757 A1* | 9/2017 | Xu ....................... | H04N 19/593 |
| 2018/0167611 A1 | 6/2018 | Francois et al. | |
| 2018/0332294 A1 | 11/2018 | Lim et al. | |
| 2019/0208192 A1 | 7/2019 | Francois et al. | |
| 2019/0208193 A1 | 7/2019 | Francois et al. | |
| 2019/0208194 A1 | 7/2019 | Francois et al. | |
| 2019/0373268 A1 | 12/2019 | Lim et al. | |
| 2020/0344485 A1 | 10/2020 | Lim et al. | |

FOREIGN PATENT DOCUMENTS

| | | |
|---|---|---|
| CN | 103797800 A | 5/2014 |
| CN | 103959775 A | 7/2014 |
| EP | 2129135 A1 | 12/2009 |
| KR | 10-2012-0074534 A | 7/2012 |
| KR | 10-1378434 B1 | 3/2014 |
| KR | 10-2014-0062509 A | 5/2014 |
| KR | 10-2014-0092405 A | 7/2014 |
| KR | 10-2014-0098113 A | 8/2014 |
| KR | 10-2014-0124443 A | 10/2014 |
| WO | 2013/039908 A2 | 3/2013 |
| WO | 2013/067334 A2 | 5/2013 |

OTHER PUBLICATIONS

Jianle Chen et al., "Algorithm Description of Joint Exploration Test Model 1", Document: JVET-B0021, Joint Video Exploration Team (JVET) of ITU-T SG 16 WP 3 and ISO/IEC JTC 1/SC 29/WG 11 2nd Meeting: San Diego, USA, Feb. 20-26, 2016.

Vivienne Sze et al., "High Efficiency Video Coding (HEVC): Algorithms and Architectures", Integrated Circuits and Systems, Springer International Publishing Switzerland 2014, <URL: https://www.springer.com/gp/book/9783319068947 >, ISSN ISBN 3-319-06895-4, <DOI: doi:10.1007/978-3-319-06895-4>.

Il-Koo Kim et al., "High Efficiency Video Coding (HEVC) Test Model 13 (HM13) Encoder Description", Document: JCTVC-O1002, Joint Collaborative Team on Video Coding (JCT-VC) of ITU-T SG16 WP3 and ISO/IEC JTC1/SC29/WG11, 15th Meeting: Geneva, CH, Oct. 23-Nov. 1, 2013.

Jianle F Chen et al., "Algorithm Description of Joint Exploration Test Model 2", Document: JVET-B1001_v1, Joint Video Exploration Team (JVET) of ITU-T SG 16 WP 3 and ISO/IEC JTC 1/SC 29/WG 11, 2nd Meeting: San Diego, USA, Feb. 20-26, 2016.

Seung-Hwan Kim et al., "Further improvement of intra coding tools", Document: JVET-B0051, Joint Video Exploration Team (JVET) of ITU-T SG 16 WP 3 and ISO/IEC JTC 1/SC 29/WG 11, 2nd Meeting: San Diego, USA, Feb. 20-26, 2016, pp. 1-4.

Jiahao Li et al., "Multiple line-based intra prediction", Document: JVET-C0071, Joint Video Exploration Team (JVET) of ITU-T SG 16 WP 3 and ISO/IEC JTC 1/SC 29/WG 11, 3rd Meeting: Geneva, CH, May 26-Jun. 1, 2016, pp. 1-6.

European Patent Office, European Search Report of corresponding EP Patent Application No. 17779330.4, Nov. 6, 2019.

State Intellectual Property Office of People's Republic of China, Office Action of corresponding CN Patent Application No. 201780021724.6, dated Sep. 28, 2020.

Jianle Chen et al., "Algorithm Description of Joint Exploration Test Model 2", Document: JVET-B1001_v3, Joint Video Exploration Team (JVET) of ITU-T SG 16 WP 3 and ISO/IEC JTC 1/SC 29/WG 11, 2nd Meeting: San Diego, USA, Feb. 20-26, 2016.

C. Rosewarne et al., "High Efficiency Video Coding (HEVC) Test Model 16 (HM 16) Improved Encoder Description Update 4", Document: JCTVC-V1002, Joint Collaborative Team on Video Coding (JCT-VC) of ITU-T SG16 WP3 and ISO/IEC JTC1/SC29/WG11, 22nd Meeting: Geneva, CH, Oct. 15-21, 2015.

Vivienne Sze et al., "High Efficiency Video Coding (HEVC)", Algorithms and Architectures, Springer International Publishing, Switzerland, 2014.

Akira Minezawa et al., "An improved intra vertical and horizontal prediction", Document: JCTVC-F172, Joint Collaborative Team on Video Coding (JCT-VC) of ITU-T SG16 WP3 and ISO/IEC JTC1/SC29/WG11, 6th Meeting: Torino, IT, Jul. 14-22, 2011, pp. 1-6.

E. Alshina et al., "Description of Exploration Experiments on Coding Tools", Document: JVET-C1011, Joint Video Exploration Team (JVET) of ITU-T SG 16 WP3 and ISO/IEC JTC 1/SC 29/WG 11, 3rd Meeting: Geneva, CH, May 26-31, 2016, pp. 1-11.

Yao-Jen Chang et al., "Arbitrary reference tier for intra directional modes", Document: JVET-C0043-v2, Joint Video Exploration Team (JVET) of ITU-T SG 16 WP 3 and ISO/IEC JTC 1/SC 29/WG 11, 3rd Meeting: Geneva, CH, May 26-Jun. 1, 2016, pp. 1-5.

Vadim Seregin et al., "Neighbor based intra most probable modes list derivation", Document: JVET-C0055, Joint Video Exploration Team (JVET) of ITU-T SG 16 WP 3 and ISO/IEC JTC 1/SC 29/WG 11, 3rd Meeting: Geneva, CH, May 26-Jun. 1, 2016, pp. 1-4.

* cited by examiner

FIG. 10

| P(i,j) | P(i,j) | P(i,j) | P(i,j)+f | P(i,j) | P(i,j)-f |
|---|---|---|---|---|---|
| P(i,j)+f | P(i,j)-f | | | | | index 0     index 1     index 2     index 3

FIG. 11

| P(i,j)+h | P(i,j)-h | P(i,j)+h | P(i,j)+f | P(i,j)-h | P(i,j)-f |
|---|---|---|---|---|---|
| P(i,j)+f | P(i,j)-f | | | | | index 0     index 1     index 2     index 3

METHOD AND APPARATUS FOR PROCESSING VIDEO SIGNAL

CROSS REFERENCE TO RELATED APPLICATIONS

This application is a National Stage Patent Application of PCT International Patent Application No. PCT/KR2017/003685 (filed on Apr. 4, 2017) under 35 U.S.C. § 371, which claims priority to Korean Patent Application Nos. 10-2016-0042095 (filed on Apr. 6, 2016) and 10-2016-0079635 (filed on Jun. 24, 2016), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is intended to provide a method and an apparatus for efficiently performing intra-prediction for an encoding/decoding target block in encoding/decoding a video signal.

An object of the present invention is intended to provide a method and an apparatus for obtaining an intra-prediction mode of an encoding/decoding target block using a neighboring block adjacent to an encoding/decoding target block in encoding/decoding a video signal.

An object of the present invention is intended to provide a method and an apparatus for performing an intra-prediction for an encoding/decoding target block based on a plurality of reference lines.

The technical objects to be achieved by the present invention are not limited to the above-mentioned technical problems. And, other technical problems that are not mentioned will be apparently understood to those skilled in the art from the following description.

Technical Solution

A method and an apparatus for decoding a video signal according to the present invention may generate a plurality of Most Probable Mode (MPM) candidates, determine whether there is an MPM candidate identical to an intra-prediction mode of a current block among the plurality of MPM candidates, obtain the intra-prediction mode of the current block, based on a result of the determining, and perform an intra-prediction for the current block, based on the intra-prediction mode of the current block. Here, the plurality of MPM candidates are generated based on occurrence frequencies of intra-prediction modes of a plurality of neighboring blocks adjacent to the current block.

In the method and the apparatus for decoding a video signal according to the present invention, generation of the plurality of MPM candidates may comprise generating a first MPM candidate group, and generating a second MPM candidate group.

In the method and the apparatus for decoding a video signal according to the present invention, the second MPM candidate group may include an MPM candidate having a direction similar to an MPM candidate included in the first MPM candidate group.

In the method and the apparatus for decoding a video signal according to the present invention, determination of whether there is an MPM candidate identical to an intra-prediction mode of a current block among the plurality of MPM candidates may comprise determining whether the first MPM candidate group includes an MPM candidate identical to the intra-prediction mode of the current block, and determining whether the second MPM candidate group includes an MPM candidate identical to the intra-prediction mode of the current block, when it is determined that the first MPM candidate group does not include an MPM candidate identical to the intra-prediction mode of the current block.

In the method and the apparatus for decoding a video signal according to the present invention, the plurality of MPM candidates may include an intra-prediction mode having a highest occurrence frequency among intra-prediction modes of a plurality of top neighboring blocks adjacent to the current block, and an intra-prediction mode having a highest occurrence frequency among intra-prediction modes of a plurality of left neighboring blocks adjacent to the current block.

In the method and the apparatus for decoding a video signal according to the present invention, the plurality of MPM candidates may include a largest or smallest intra-prediction mode among intra-prediction modes of top neighboring blocks and intra-prediction modes of neighboring blocks.

In the method and the apparatus for decoding a video signal according to the present invention, when it is determined that there is no MPM candidate identical to the intra-prediction mode of the current block among the plurality of MPM candidates, the obtaining the intra-prediction mode of the current block may comprises decoding a remaining mode, and determining the intra-prediction mode of the current block based on the remaining mode.

In the method and the apparatus for decoding a video signal according to the present invention, the remaining mode may be encoded as a fixed length.

In the method and the apparatus for decoding a video signal according to the present invention, the performing the intra-prediction for the current block may comprise selecting a reference line among a plurality of reference lines of the current block, and obtaining a prediction sample for the current block, using the selected reference line.

In the method and the apparatus for decoding a video signal according to the present invention, among the plurality of reference lines, an N-th reference line includes a larger number of reference samples than an (N−1)-th reference sample.

A method and an apparatus for encoding a video signal according to the present invention may generate a plurality of Most Probable Mode (MPM) candidates, determine whether there is an MPM candidate identical to an intra-prediction mode of a current block among the plurality of MPM candidates, and encode information indicating whether MPM candidate is included in the plurality of MPM candidates identical to intra prediction mode of the current block. Here, the plurality of MPM candidates are generated based on occurrence frequencies of intra-prediction modes of a plurality of neighboring blocks adjacent to the current block.

The features briefly summarized above for the present invention are only illustrative aspects of the detailed description of the invention that follows, but do not limit the scope of the invention.

Advantageous Effects

According to the present invention, an efficient intra-prediction may be performed for an encoding/decoding target block.

According to the present invention, an intra-prediction mode of an encoding/decoding target block may be obtained using a neighboring block adjacent to an encoding/decoding target block.

According to the present invention, an intra-prediction for an encoding/decoding target block may be performed based on a plurality of reference lines.

The effects obtainable by the present invention are not limited to the above-mentioned effects, and other effects not mentioned can be clearly understood by those skilled in the art from the description below.

DESCRIPTION OF DRAWINGS

FIGS. 10 to 14 are views illustrating examples of an intra prediction pattern of a current block according to an embodiment of the present invention.

MODE FOR INVENTION

Figure 1:
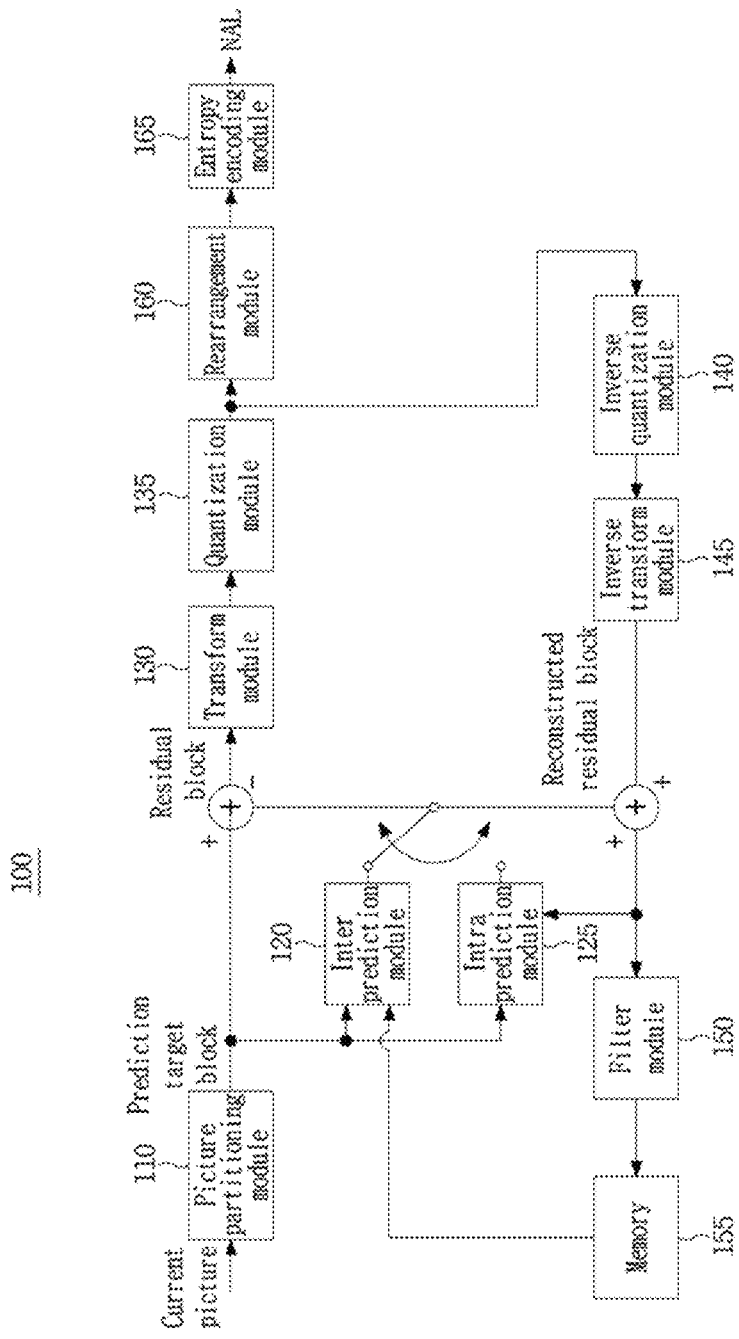
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
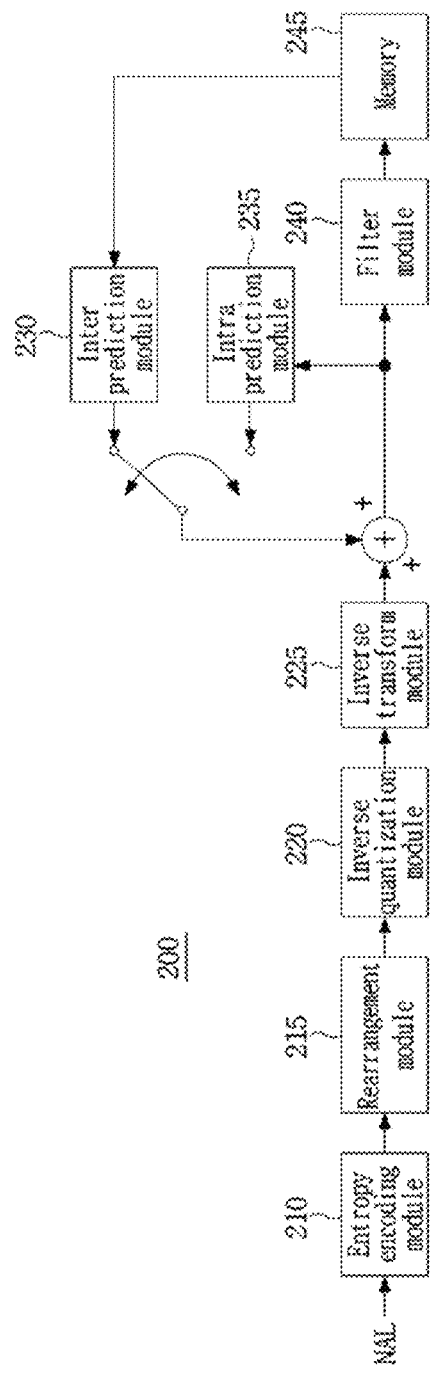
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

Figure 3:
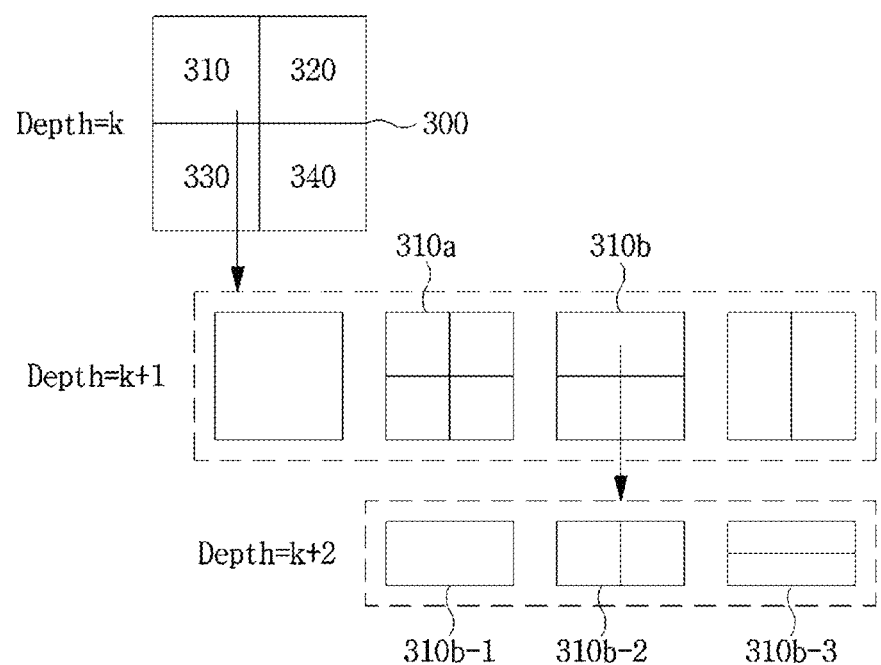
FIG. 3 is a view illustrating an example of hierarchically partitioning a coding block based on a tree structure according to an embodiment of the present invention.

FIG. 3 is a view illustrating an example of hierarchically partitioning a coding block based on a tree structure according to an embodiment of the present invention.

An input video signal is decoded in predetermined block units. Such a default unit for decoding the input video signal is a coding block. The coding block may be a unit performing intra/inter prediction, transform, and quantization. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree and a binary tree. Here, quad tree-based partitioning may mean that a 2N×2N coding block is partitioned into four N×N coding blocks, and binary tree-based partitioning may mean that one coding block is partitioned into two coding blocks. Binary tree-based partitioning may be symmetrically or asymmetrically performed. The coding block partitioned based on the binary tree may be a square block or a non-square block, such as a rectangular shape. Binary tree-based partitioning may be performed on a coding block where quad tree-based partitioning is no longer performed. Quad tree-based partitioning may no longer be performed on the coding block partitioned based on the binary tree.

In order to implement adaptive partitioning based on the quad tree or binary tree, information indicating quad tree-based partitioning, information on the size/depth of the coding block that quad tree-based partitioning is allowed, information indicating binary tree-based partitioning, information on the size/depth of the coding block that binary tree-based partitioning is allowed, information on the size/depth of the coding block that binary tree-based partitioning is not allowed, information on whether binary tree-based partitioning is performed in a vertical direction or a horizontal direction, etc. may be used.

As shown in FIG. 3, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning and the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of a vertical direction or coding blocks 310b-3 of a horizontal direction based on the binary tree, and the partition depth of the relevant coding blocks may be increased to k+3. Alternatively, the third coding block 310b may be determined as a leaf coding block 310b-1 that is no longer partitioned based on the binary tree. In this case, the coding block 310b-1 may be used as a prediction block or a transform block. However, the above partitioning process may be limitedly performed based on at least one of the information on the size/depth of the coding block that quad tree-based partitioning is allowed, the information on the size/depth of the coding block that binary tree-based partitioning is allowed, and the information on the size/depth of the coding block that binary tree-based partitioning is not allowed.

Figure 4:
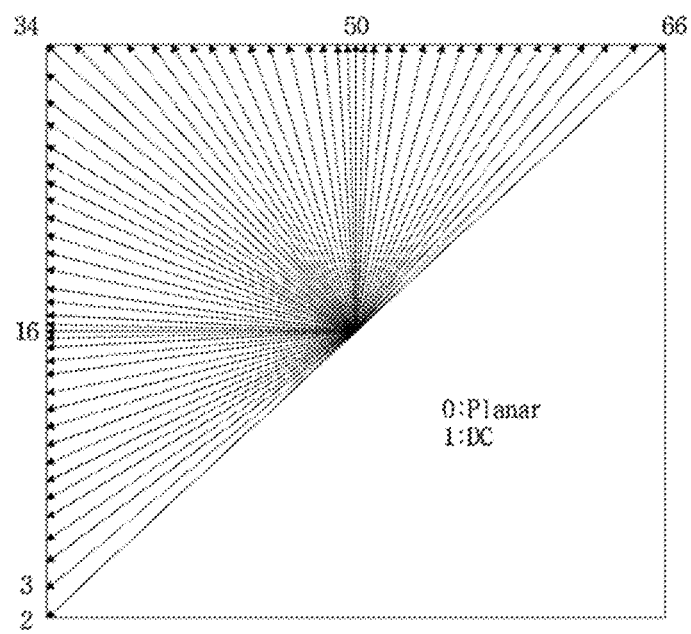
FIG. 4 is a view illustrating types of pre-defined intra prediction modes for a device for encoding/decoding a video according to an embodiment of the present invention.

FIG. 4 is a view illustrating types of pre-defined intra prediction modes for a device for encoding/decoding a video according to an embodiment of the present invention.

The device for encoding/decoding a video may perform intra prediction using one of pre-defined intra prediction modes. The pre-defined intra prediction modes for intra prediction may include non-directional prediction modes (e.g., a planar mode, a DC mode) and 33 directional prediction modes.

Alternatively, in order to enhance accuracy of intra prediction, a larger number of directional prediction modes than the 33 directional prediction modes may be used. That is, M extended directional prediction modes may be defined by subdividing angles of the directional prediction modes (M>33), and a directional prediction mode having a predetermined angle may be derived using at least one of the 33 pre-defined directional prediction modes.

FIG. 4 shows an example of extended intra prediction modes, and the extended intra prediction modes may include two non-directional prediction modes and 65 extended directional prediction modes. The same numbers of the extended intra prediction modes may be used for a luma component and a chroma component, or a different number of intra prediction modes may be used for each component. For example, 67 extended intra prediction modes may be used for the luma component, and 35 intra prediction modes may be used for the chroma component.

Alternatively, depending on the chroma format, a different number of intra prediction modes may be used in performing intra prediction. For example, in the case of the 4:2:0 format, 67 intra prediction modes may be used for the luma component to perform intra prediction and 35 intra prediction modes may be used for the chroma component. In the case of the 4:4:4 format, 67 intra prediction modes may be used for both the luma component and the chroma component to perform intra prediction.

Alternatively, depending on the size and/or shape of the block, a different number of intra prediction modes may be used to perform intra prediction. That is, depending on the size and/or shape of the PU or CU, 35 intra prediction modes or 67 intra prediction modes may be used to perform intra prediction. For example, when the CU or PU has the size less than 64×64 or is asymmetrically partitioned, 35 intra prediction modes may be used to perform intra prediction. When the size of the CU or PU is equal to or greater than 64×64, 67 intra prediction modes may be used to perform intra prediction. 65 directional intra prediction modes may be allowed for Intra 2N×2N, and only 35 directional intra prediction modes may be allowed for Intra N×N.

Figure 5:
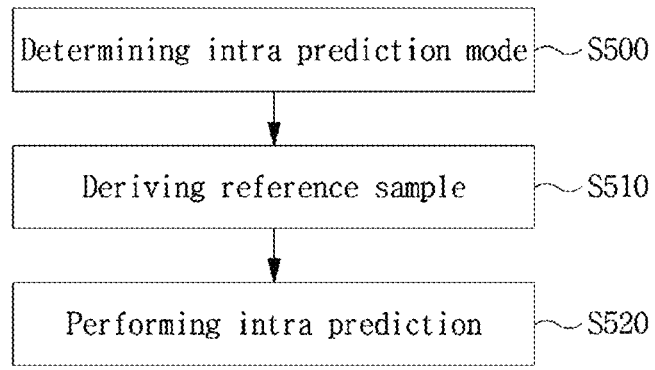
FIG. 5 is a flowchart briefly illustrating an intra prediction method according to an embodiment of the present invention.

FIG. 5 is a flowchart briefly illustrating an intra prediction method according to an embodiment of the present invention.

Referring to FIG. 5, an intra prediction mode of the current block may be determined at step S500.

Specifically, the intra prediction mode of the current block may be derived based on a candidate list and an index. Here, the candidate list contains multiple candidates, and the multiple candidates may be determined based on an intra prediction mode of the neighboring block adjacent to the current block. The neighboring block may include at least one of blocks positioned at the top, the bottom, the left, the right, and the corner of the current block. The index may specify one of the multiple candidates of the candidate list. The candidate specified by the index may be set to the intra prediction mode of the current block.

An intra prediction mode used for intra prediction in the neighboring block may be set as a candidate. Also, an intra prediction mode having directionality similar to that of the intra prediction mode of the neighboring block may be set as a candidate. Here, the intra prediction mode having similar directionality may be determined by adding or subtracting a predetermined constant value to or from the intra prediction mode of the neighboring block. The predetermined constant value may be an integer, such as one, two, or more.

The candidate list may further include a default mode. The default mode may include at least one of a planar mode, a DC mode, a vertical mode, and a horizontal mode. The default mode may be adaptively added considering the maximum number of candidates that can be included in the candidate list of the current block.

The maximum number of candidates that can be included in the candidate list may be three, four, five, six, or more. The maximum number of candidates that can be included in the candidate list may be a fixed value preset in the device for encoding/decoding a video, or may be variably determined based on a characteristic of the current block. The characteristic may mean the location/size/shape of the block, the number/type of intra prediction modes that the block can use, etc. Alternatively, information indicating the maximum number of candidates that can be included in the candidate list may be signaled separately, and the maximum number of candidates that can be included in the candidate list may be variably determined using the information. The information indicating the maximum number of candidates may be signaled in at least one of a sequence level, a picture level, a slice level, and a block level.

When the extended intra prediction modes and the 35 pre-defined intra prediction modes are selectively used, the intra prediction modes of the neighboring blocks may be transformed into indexes corresponding to the extended intra prediction modes, or into indexes corresponding to the 35 intra prediction modes, whereby candidates can be derived. For transform to an index, a pre-defined table may be used, or a scaling operation based on a predetermined value may be used. Here, the pre-defined table may define a mapping relation between different intra prediction mode groups (e.g., extended intra prediction modes and 35 intra prediction modes).

For example, when the left neighboring block uses the 35 intra prediction modes and the intra prediction mode of the left neighboring block is 10 (a horizontal mode), it may be transformed into an index of 16 corresponding to a horizontal mode in the extended intra prediction modes.

Alternatively, when the top neighboring block uses the extended intra prediction modes and the intra prediction mode the top neighboring block has an index of 50 (a vertical mode), it may be transformed into an index of 26 corresponding to a vertical mode in the 35 intra prediction modes.

Based on the above-described method of determining the intra prediction mode, the intra prediction mode may be derived independently for each of the luma component and the chroma component, or the intra prediction mode of the chroma component may be derived depending on the intra prediction mode of the luma component.

Specifically, the intra prediction mode of the chroma component may be determined based on the intra prediction mode of the luma component as shown in the following Table 1.

TABLE 1

| Intra_chroma_pred_mode[xCb][yCb] | IntraPredModeY[xCb][yCb] | | | | |
|---|---|---|---|---|---|
| | 0 | 26 | 10 | 1 | X(0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

In Table 1, intra_chroma_pred_mode means information signaled to specify the intra prediction mode of the chroma component, and IntraPredModeY indicates the intra prediction mode of the luma component.

Referring to FIG. 5, a reference sample for intra prediction of the current block may be derived at step S510.

Specifically, a reference sample for intra prediction may be derived based on a neighboring sample of the current block. The neighboring sample may be a reconstructed sample of the neighboring block, and the reconstructed sample may be a reconstructed sample before an in-loop filter is applied or a reconstructed sample after the in-loop filter is applied.

A neighboring sample reconstructed before the current block may be used as the reference sample, and a neighboring sample filtered based on a predetermined intra filter may be used as the reference sample. The intra filter may include at least one of the first intra filter applied to multiple neighboring samples positioned on the same horizontal line and the second intra filter applied to multiple neighboring samples positioned on the same vertical line. Depending on the positions of the neighboring samples, one of the first intra filter and the second intra filter may be selectively applied, or both intra filters may be applied.

Filtering may be adaptively performed based on at least one of the intra prediction mode of the current block and the size of the transform block for the current block. For example, when the intra prediction mode of the current block is the DC mode, the vertical mode, or the horizontal mode, filtering may not be performed. When the size of the transform block is N×M, filtering may not be performed. Here, N and M may be the same values or different values, or may be values of 4, 8, 16, or more. Alternatively, filtering may be selectively performed based on the result of a comparison of a pre-defined threshold and the difference between the intra prediction mode of the current block and the vertical mode (or the horizontal mode). For example, when the difference between the intra prediction mode of the current block and the vertical mode is greater than a threshold, filtering may be performed. The threshold may be defined for each size of the transform block as shown in Table 2.

TABLE 2

| | 8 × 8 transform | 16 × 16 transform | 32 × 32 transform |
|---|---|---|---|
| Threshold | 7 | 1 | 0 |

The intra filter may be determined as one of multiple intra filter candidates pre-defined in the device for encoding/decoding a video. To this end, an index specifying an intra filter of the current block among the multiple intra filter candidates may be signaled. Alternatively, the intra filter may be determined based on at least one of the size/shape of the current block, the size/shape of the transform block, information on the filter strength, and variations of the neighboring samples.

Referring to FIG. 5, intra prediction may be performed using the intra prediction mode of the current block and the reference sample at step S520.

That is, the prediction sample of the current block may be obtained using the intra prediction mode determined at step S500 and the reference sample derived at step S510. However, in the case of intra prediction, a boundary sample of the neighboring block may be used, and thus quality of the prediction picture may be decreased. Therefore, a correction process may be performed on the prediction sample generated through the above-described prediction process, and will be described in detail with reference to FIGS. 6 to 14. However, the correction process is not limited to being applied only to the intra prediction sample, and may be applied to an inter prediction sample or the reconstructed sample.

Figure 6:
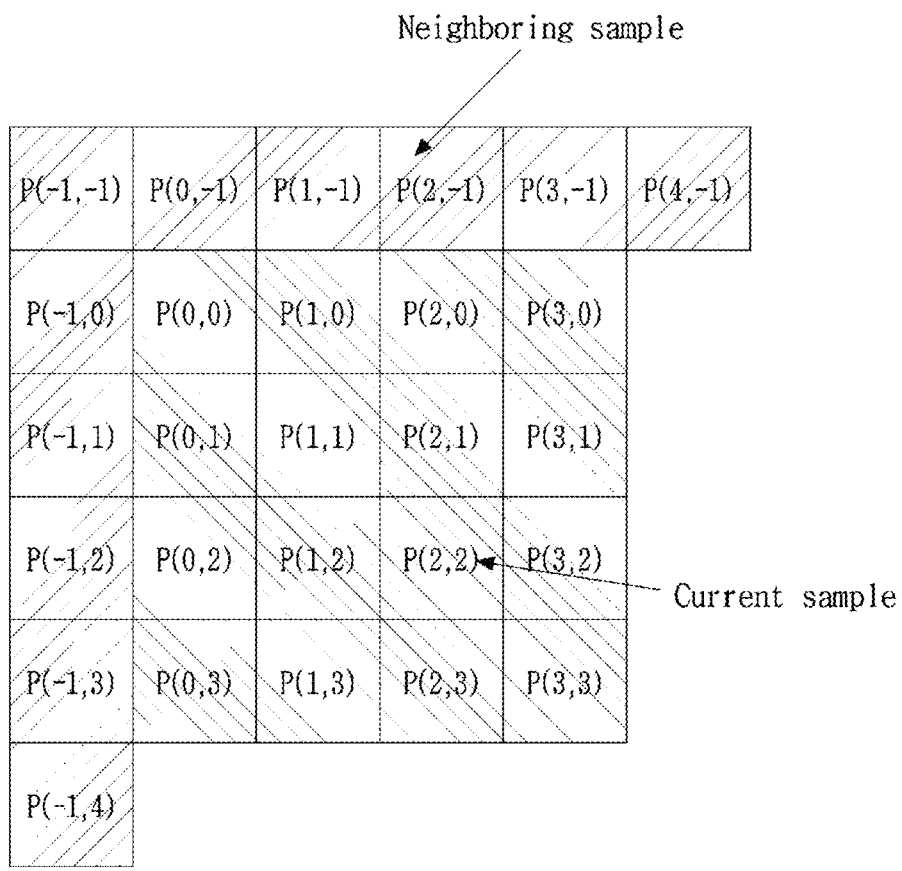
FIG. 6 is a view illustrating a method of correcting a prediction sample of a current block based on differential information of neighboring samples according to an embodiment of the present invention.

FIG. 6 is a view illustrating a method of correcting a prediction sample of a current block based on differential information of neighboring samples according to an embodiment of the present invention.

The prediction sample of the current block may be corrected based on the differential information of multiple neighboring samples for the current block. The correction may be performed on all prediction samples in the current block, or may be performed on prediction samples in some predetermined regions. Some regions may be one row/column or multiple rows/columns, or may be preset regions for correction in the device for encoding/decoding a video, or may be variably determined based on at least one of the size/shape of the current block and the intra prediction mode.

The neighboring samples may belong to the neighboring blocks positioned at the top, the left, and the top left corner of the current block. The number of neighboring samples used for correction may be two, three, four, or more. The positions of the neighboring samples may be variably determined depending on the position of the prediction sample which is the correction target in the current block. Alternatively, some of the neighboring samples may have fixed positions regardless of the position of the prediction sample which is the correction target, and the remaining neighboring samples may have variable positions depending on the position of the prediction sample which is the correction target.

The differential information of the neighboring samples may mean a differential sample between the neighboring samples, or may mean a value obtained by scaling the differential sample by a predetermined constant value (e.g., one, two, three, etc.). Here, the predetermined constant value may be determined considering the position of the prediction sample which is the correction target, the position of the column or row including the prediction sample which is the correction target, the position of the prediction sample within the column or row, etc.

For example, when the intra prediction mode of the current block is the vertical mode, differential samples between the top left neighboring sample p(−1, −1) and neighboring samples p (−1, y) adjacent to the left boundary of the current block may be used to obtain the final prediction sample as shown in Equation 1.

$$P'(0,y)=P(0,y)+((p(-1,y)-p(-1,-1))>>1 \text{ for } y=0 \ldots N-1 \quad \text{[Equation 1]}$$

For example, when the intra prediction mode of the current block is the horizontal mode, differential samples between the top left neighboring sample p(−1, −1) and neighboring samples p(x, −1) adjacent to the top boundary of the current block may be used to obtain the final prediction sample as shown in Equation 2.

$$P'(x,0)=p(x,0)+((p(x,-1)-p(-1,-1))>>1 \text{ for } x=0 \ldots N-1 \quad \text{[Equation 2]}$$

For example, when the intra prediction mode of the current block is the vertical mode, differential samples between the top left neighboring sample p(−1, −1) and neighboring samples p(−1, y) adjacent to the left boundary of the current block may be used to obtain the final prediction sample. Here, the differential sample may be added to the prediction sample, or the differential sample may be scaled by a predetermined constant value, and then added to the prediction sample. The predetermined constant value used in scaling may be determined differently depending on the column and/or row. For example, the prediction sample may be corrected as shown in Equation 3 and Equation 4.

$$P'(0,y)=P(0,y)+((p(-1,y)-p(-1,-1))>>1 \text{ for } y=0 \ldots N-1 \quad \text{[Equation 3]}$$

$$P'(1,y)=P(1,y)+((p(-1,y)-p(-1,-1))>>2 \text{ for } y=0 \ldots N-1 \quad \text{[Equation 4]}$$

For example, when the intra prediction mode of the current block is the horizontal mode, differential samples between the top left neighboring sample p(−1, −1) and neighboring samples p(x, −1) adjacent to the top boundary of the current block may be used to obtain the final prediction sample, as described in the case of the vertical mode. For example, the prediction sample may be corrected as shown in Equation 5 and Equation 6.

$$P'(x,0)=p(x,0)+((p(x,-1)-p(-1,-1))>>1 \text{ for } x=0 \ldots N-1 \quad \text{[Equation 5]}$$

$$P'(x,1)=p(x,1)+((p(x,-1)-p(-1,-1))>>2 \text{ for } x=0 \ldots N-1 \quad \text{[Equation 6]}$$

Figure 7:
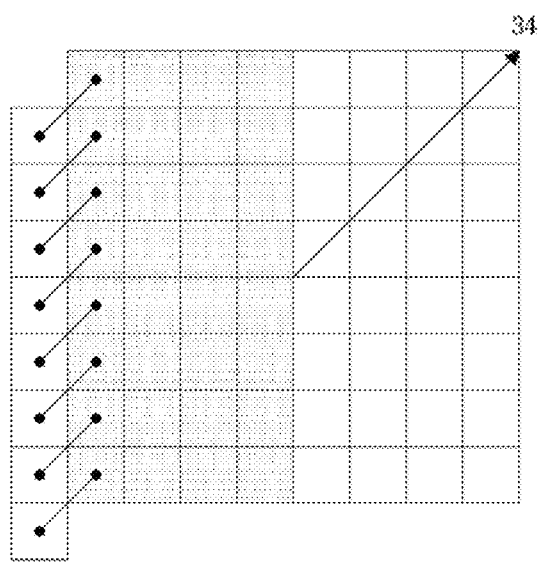
FIGS. 7 and 8 are views illustrating a method of correcting a prediction sample based on a predetermined correction filter according to an embodiment of the present invention.
Figure 8:
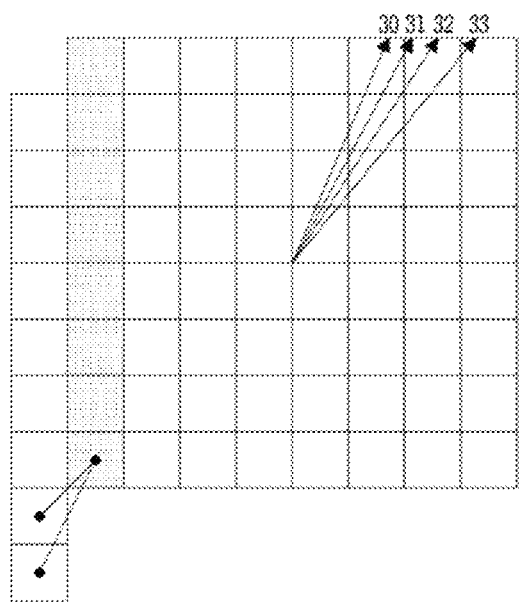

FIGS. 7 and 8 are views illustrating a method of correcting a prediction sample based on a predetermined correction filter according to an embodiment of the present invention.

The prediction sample may be corrected based on the neighboring sample of the prediction sample which is the correction target and a predetermined correction filter. Here, the neighboring sample may be specified by an angular line of the directional prediction mode of the current block, or may be at least one sample positioned on the same angular line as the prediction sample which is the correction target. Also, the neighboring sample may be a prediction sample in the current block, or may be a reconstructed sample in a neighboring block reconstructed before the current block.

At least one of the number of taps, strength, and a filter coefficient of the correction filter may be determined based on at least one of the position of the prediction sample which is the correction target, whether or not the prediction sample which is the correction target is positioned on the boundary of the current block, the intra prediction mode of the current block, angle of the directional prediction mode, the prediction mode (inter or intra mode) of the neighboring block, and the size/shape of the current block.

Referring to FIG. 7, when the directional prediction mode has an index of 2 or 34, at least one prediction/reconstructed sample positioned at the bottom left of the prediction sample which is the correction target and the predetermined correction filter may be used to obtain the final prediction sample. Here, the prediction/reconstructed sample at the bottom left may belong to a previous line of a line including the prediction sample which is the correction target. The prediction/reconstructed sample at the bottom left may belong to the same block as the current sample, or to neighboring block adjacent to the current block.

Filtering for the prediction sample may be performed only on the line positioned at the block boundary, or may be performed on multiple lines. The correction filter where at least one of the number of filter taps and a filter coefficient is different for each of lines may be used. For example, a (½, ½) filter may be used for the left first line closest to the block boundary, a (12/16, 4/16) filter may be used for the second line, a (14/16, 2/16) filter may be used for the third line, and a (15/16, 1/16) filter may be used for the fourth line.

Alternatively, when the directional prediction mode has an index of 3 to 6 or 30 to 33, filtering may be performed on the block boundary as shown in FIG. 8, and a 3-tap correction filter may be used to correct the prediction sample. Filtering may be performed using the bottom left sample of the prediction sample which is the correction target, the bottom sample of the bottom left sample, and a 3-tap correction filter that takes as input the prediction sample which is the correction target. The position of neighboring sample used by the correction filter may be determined differently based on the directional prediction mode. The filter coefficient of the correction filter may be determined differently depending on the directional prediction mode.

Different correction filters may be applied depending on whether the neighboring block is encoded in the inter mode or the intra mode. When the neighboring block is encoded in the intra mode, a filtering method where more weight is given to the prediction sample may be used, compared to when the neighboring block is encoded in the inter mode. For example, in the case of that the intra prediction mode is 34, when the neighboring block is encoded in the inter mode, a (½, ½) filter may be used, and when the neighboring block is encoded in the intra mode, a (4/16, 12/16) filter may be used.

The number of lines to be filtered in the current block may vary depending on the size/shape of the current block (e.g., the coding block or the prediction block). For example, when the size of the current block is equal to or less than 32×32, filtering may be performed on only one line at the block boundary; otherwise, filtering may be performed on multiple lines including the one line at the block boundary.

FIGS. 7 and 8 are based on the case where the 35 intra prediction modes in FIG. 4 are used, but may be equally/similarly applied to the case where the extended intra prediction modes are used.

When performing intra prediction on a current block based on a directional intra prediction mode, a generated prediction sample may not reflect the characteristics of an original picture since a range of reference samples being used is limited (e.g., intra prediction is performed only using the neighboring samples adjacent to the current block). For example, when an edge exists in a current block or when a new object appears around a boundary of the current block, a difference between a prediction sample and an original picture may be large depending on a position of a prediction sample in the current block.

In this case, a residual value is relatively large, and thus the number of bits to be encoded/decoded may increase. Particularly, a residual value in a region relatively far from a boundary of the current block may include a large amount of high-frequency components, which may result in degradation of encoding/decoding efficiency.

In order to solve the above problems, a method of generating or updating a prediction sample in units of sub-block may be used. According to this, prediction accuracy in a region relatively far from a block boundary may be enhanced.

For convenience of explanation, in the following embodiments, a prediction sample generated based on a directional intra prediction mode is referred to as a first prediction sample. Also, a prediction sample generated based on a non-directional intra prediction mode or a prediction sample generated by performing inter prediction may also be included in a category of the first prediction sample.

A method of correcting the prediction sample based on the offset will be described in detail with reference to FIG. 9.

Figure 16:
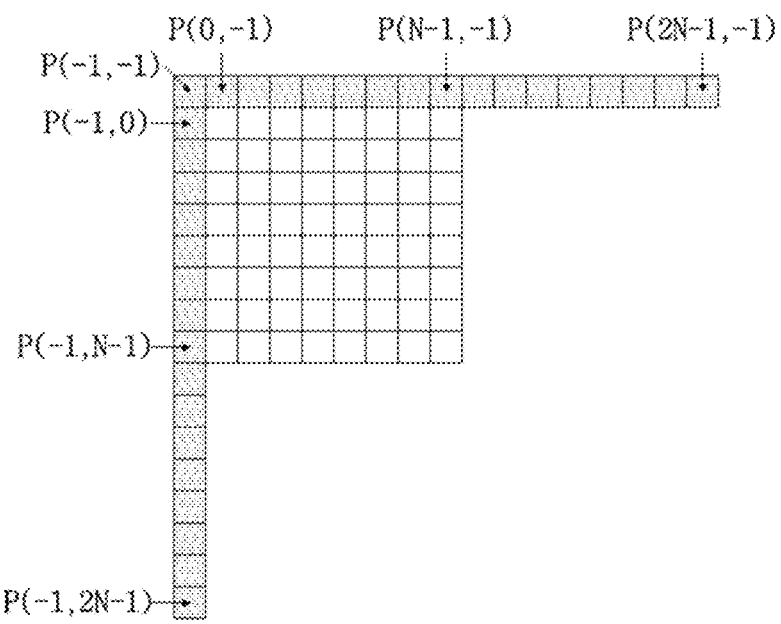
FIG. 16 shows a range of reference samples for intra prediction according to an embodiment to which the present invention is applied.

FIG. 16 is a view illustrating a method of correcting a prediction sample based on offset according to an embodiment of the present invention.

Figure 9:
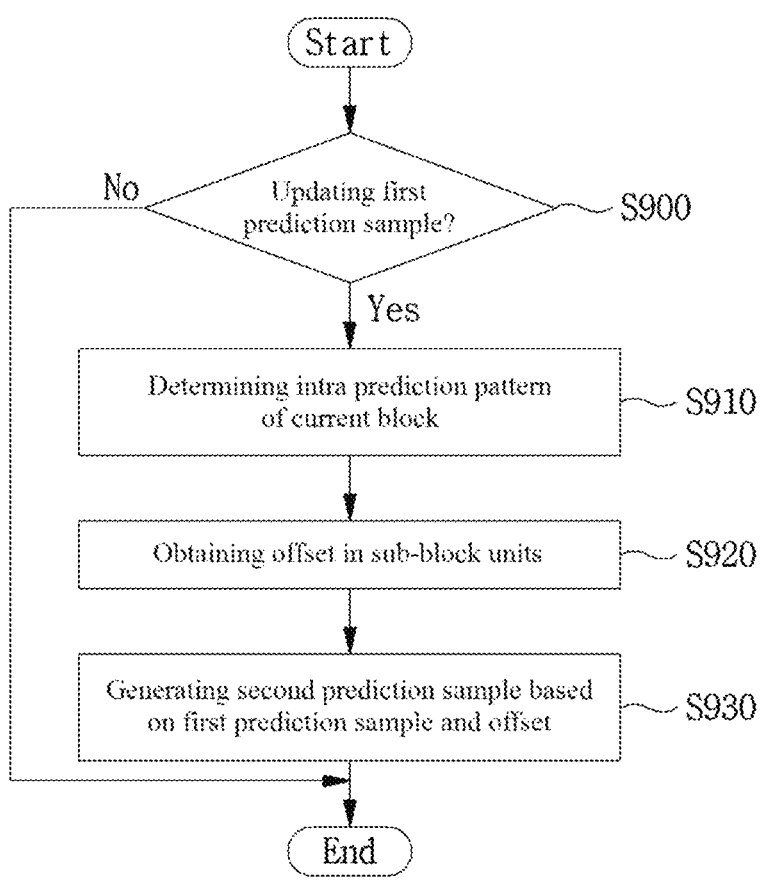
FIG. 9 is a view illustrating a method of correcting a prediction sample based on offset according to an embodiment of the present invention.

Referring to FIG. 9, for a current block, whether to update a first prediction sample using an offset may be determined at step S900. Whether to update the first prediction sample using the offset may be determined by a flag decoded from a bitstream. For example, a syntax 'is_sub_block_refinement_flag' indicating whether to update the first prediction sample using the offset may be signaled through a bitstream. When a value of is_sub_block_refinement_flag is 1, the method of updating the first prediction sample using the offset may be used in the current block. When a value of is_sub_block_refinement_flag is 0, the method of updating the first prediction sample using the offset may not be used in the current block. However, step S900 is intended to selectively perform updating of the first prediction sample, and is not an essential configuration for achieving the purpose of the present invention, so that step S900 may be omitted in some cases.

When it is determined that the method of updating the first prediction sample using the offset is used, an intra prediction pattern of the current block may be determined at step S910. Through the intra prediction pattern, all or some regions of the current block to which the offset is applied, a partition type of the current block, whether to apply the offset to a sub-block included in the current block, a size/sign of the offset assigned to each sub-block, etc. may be determined.

One of multiple patterns pre-defined in the device for encoding/decoding a video may be selectively used as the intra prediction pattern of the current block, and to this end, an index specifying the intra prediction pattern of the current block may be signaled from a bitstream. As another example, the intra prediction pattern of the current block may be determined based on a partition mode of a prediction unit or a coding unit of the current block, a size/shape of the block, whether the directional intra prediction mode is used, an angle of the directional intra prediction mode, etc.

It is determined by predetermined flag information signaled via a bitstream whether or not an index indicating the intra prediction pattern of the current block is signaled. For example, when the flag information indicates that index indicating the intra prediction pattern of the current block is signaled from a bitstream, the intra prediction pattern of the current block may be determined based on an index decoded from a bitstream. Here, the flag information may be signaled in at least one of a picture level, a slice level, and a block level.

When the flag information indicates that the index indicating the intra prediction pattern of the current block is not signaled from a bitstream, the intra prediction pattern of the current block may be determined based on the partition mode of the prediction unit or the coding unit of the current block, etc. For example, the pattern in which the current block is partitioned into sub-blocks may be the same as the pattern in which the coding block is partitioned into prediction units.

When the intra prediction pattern of the current block is determined, the offset may be obtained in units of sub-block at step S920. The offset may be signaled in units of a slice, a coding unit, or a prediction unit. As another example, the offset may be derived from a neighboring sample of the current block. The offset may include at least one of offset value information and offset sign information. Here, the offset value information may be in a range of integers equal to or greater than zero.

When the offset is determined, a second prediction sample may be obtained for each sub-block at step S930. The second prediction sample may be obtained by applying the offset to the first prediction sample. For example, the second prediction sample may be obtained adding or subtracting the offset to or from the first prediction sample.

FIGS. 10 to 14 are views illustrating examples of an intra prediction pattern of a current block according to an embodiment of the present invention.

For example, in the example shown in FIG. 10, when the index is '0' or '1', the current block may be partitioned into upper and lower sub-blocks. The offset may be not set to the upper sub-block, and the offset 'f' may be set to the lower sub-block. Therefore, the first prediction sample (P(i,j)) may be used as it is in the upper sub-block, and the second prediction sample (P(i,j)+f or P(i,j)−f) that is generated by adding or subtracting the offset to or from the first prediction sample may be used in the lower sub-block. In the present invention, 'not set' may mean that the offset is not assigned to the block, or the offset having the value of '0' may be assigned to the block.

When the index is '2' or '3', the current block is partitioned into left and right sub-blocks. The offset may not be set for the left sub-block, and the offset 'f' may be set for the right sub-block. Therefore, the first prediction sample (P(i, j)) may be used as it is in the left sub-block, and the second prediction sample (P(i,j)+f or P(i,j)−f) that is generated adding or subtracting the offset to or from the first prediction sample may be used in the right sub-block.

The range of available intra prediction patterns may be limited based on the intra prediction mode of the current block. For example, when the intra prediction mode of the current block is a vertical direction intra prediction mode or a prediction mode in a direction similar to the vertical direction intra prediction mode (e.g., among the 33 directional prediction modes, when the intra prediction mode has an index of 22 to 30), only the intra prediction pattern partitioning the current block in a horizontal direction (e.g., the index 0 or index 1 in FIG. 17) may be applied to the current block.

As another example, when the intra prediction mode of the current block is a horizontal direction intra prediction mode or a prediction mode in a direction similar to the horizontal direction intra prediction mode (e.g., among the 33 directional prediction modes, when the intra prediction mode has an index of 6 to 14), only the intra prediction pattern partitioning the current block in a vertical direction (e.g., the index 2 or index 3 in FIG. 17) may be applied to the current block.

In FIG. 10, the offset is not set for one of the sub-blocks included in the current block, but it is set for the other. Whether to set the offset for the sub-block may be determined based on information signaled for each sub-block.

Whether to set the offset for the sub-block may be determined based on a position of the sub-block, an index for identifying the sub-block in the current block, etc. For example, based on a predetermined boundary of the current block, the offset may not set for the sub-block which adjacent to the predetermined boundary, and the offset may be set for the sub-block which is not adjacent to the predetermined boundary.

When assuming that the predetermined boundary is the top boundary of the current block, under the intra prediction pattern corresponding to the index '0' or '1', the offset may be not set for the sub-block which is adjacent to the top boundary of the current block, and the offset may be set for the sub-block which is not adjacent to the top boundary of the current block.

When assuming that the predetermined boundary is the left boundary of the current block, under the intra prediction pattern corresponding to the index '2' or '3', the offset may not be set for the sub-block which is adjacent to the left boundary of the current block, and the offset may be set for the sub-block which is not adjacent to the left boundary of the current block.

In FIG. 10, it is assumed that the offset is not set for one of the sub-blocks included in the current block but the offset is set for another one. As another example, different values of the offset may be set for the sub-blocks included in the current block.

An example where different offset is set for each sub-block will be described with reference to FIG. 11.

Referring to FIG. 11, when the index is '0' or '1', the offset 'h' may be set for the upper sub-block of the current block, and the offset 'f' may be set for the lower sub-block of the current block. Therefore, the second prediction sample $(P(i,j)+h$ or $P(i,j)-h)$ may be generated by adding or subtracting the offset 'h' to or from the first prediction sample in the upper sub-block, and the second prediction sample $(P(i,j)+f$ or $P(i,j)-f)$ may be generated by adding or subtracting the offset 'f' to or from the first prediction sample.

Referring to FIG. 11, when the index is '2' or '3', the offset 'h' may be set for the left sub-block of the current block, and the offset 'f' may be set for the right sub-block of the current block. Therefore, the second prediction sample $(P(i,j)+h$ or $P(i,j)-h)$ may be generated by adding or subtracting the offset 'h' to or from the first prediction sample may in the left sub-block, and the second prediction sample $(P(i,j)+f$ or $P(i,j)-f)$ may be generated by adding or subtracting the offset 'f' to or from the first prediction sample in the right sub-block.

In FIGS. 10 and 11, the current block is partitioned into two sub-blocks having the same size, but the number of sub-blocks and/or the size of sub-blocks included in the current block is not limited to the examples shown in FIGS. 10 and 11. The number of sub-blocks included in the current block may be three or more, and the sub-blocks may have different sizes.

When multiple intra prediction patterns are available, the available intra prediction patterns may be grouped into multiple categories. In this case, the intra prediction pattern of the current block may be selected based on a first index for identifying a category and a second index identifying an intra prediction pattern in the category.

An example where the intra prediction pattern of the current block is determined based on the first index and the second index will be described with reference to FIG. 12.

Figure 12:
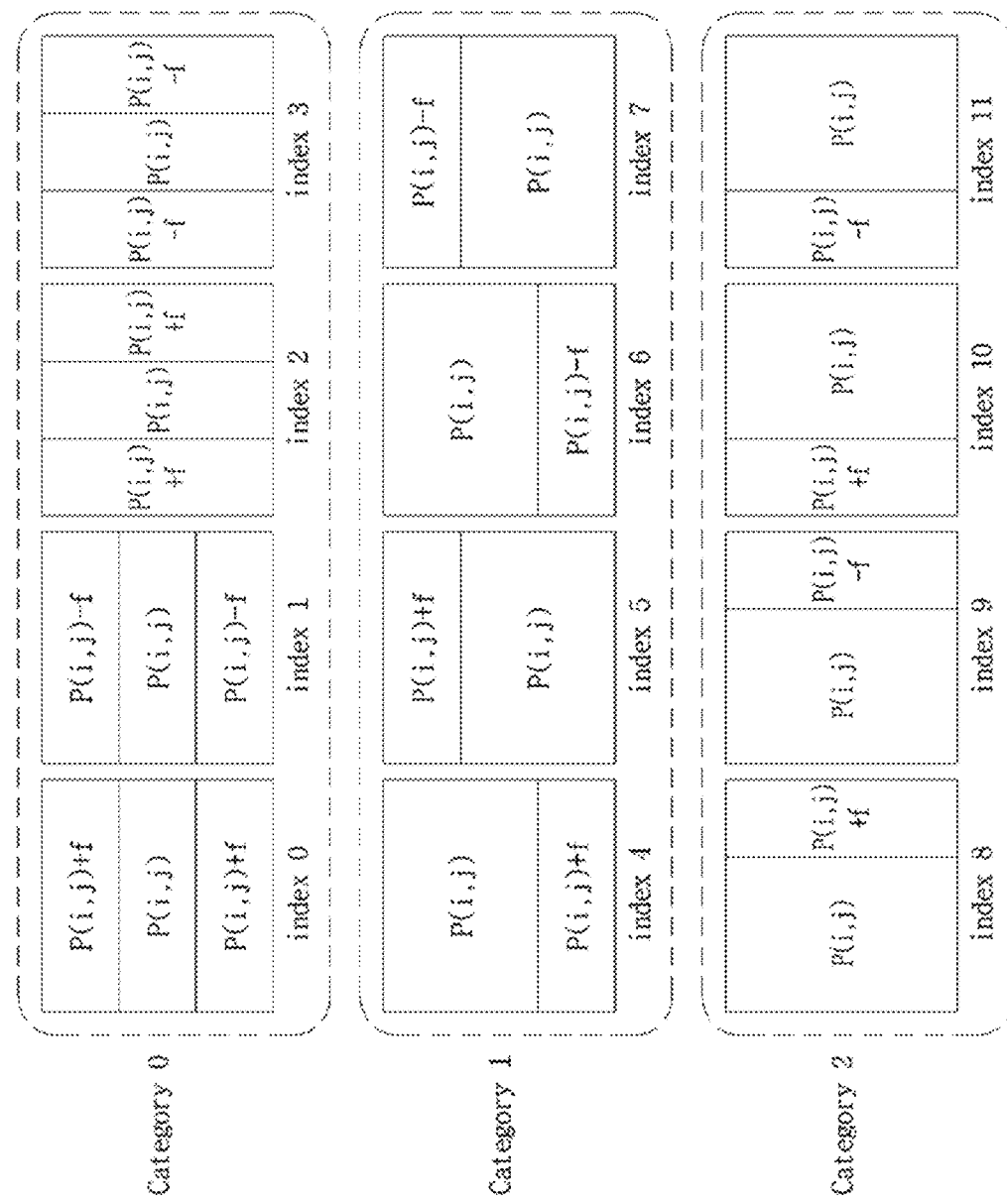
Figure 13:
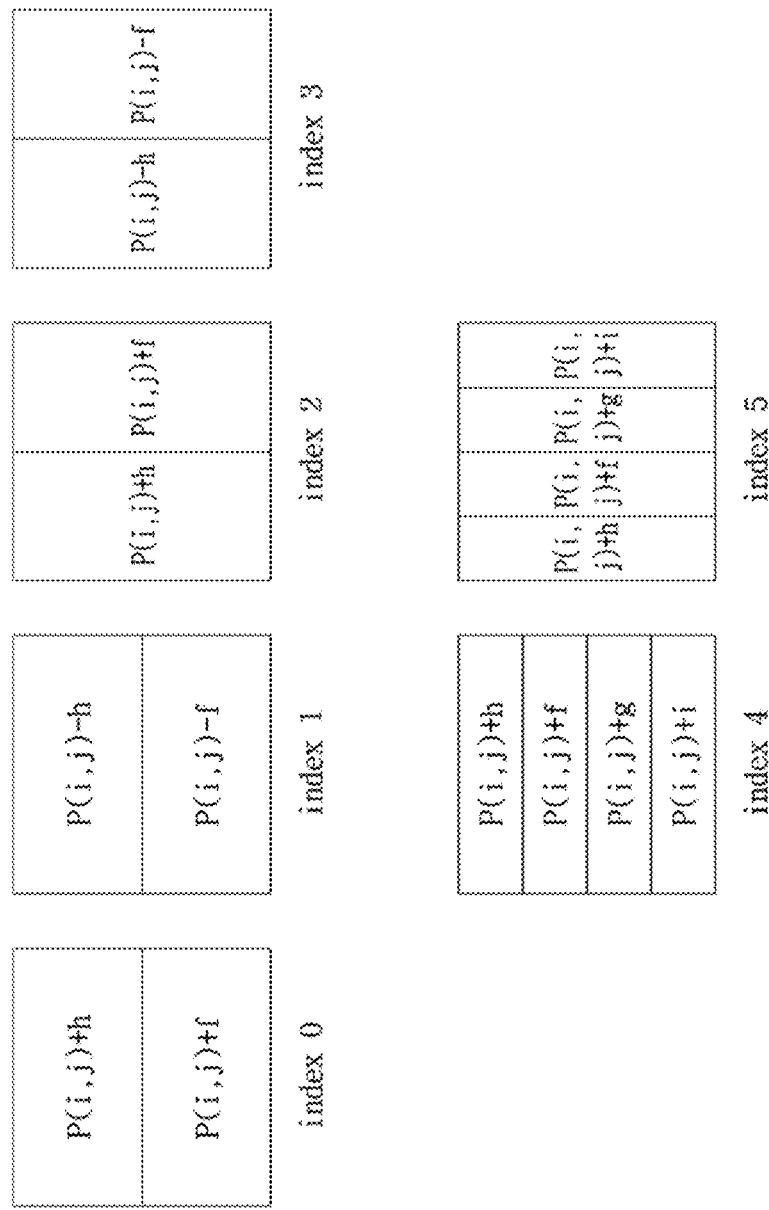

In the example shown in FIG. 12, 12 intra prediction patterns may be classified into three categories each including four intra prediction patterns. For example, intra prediction patterns corresponding to indexes 0 to 3 may be classified as a category 0, intra prediction patterns corresponding to indexes 4 to 7 may be classified as a category 1, and intra prediction patterns corresponding to indexes 8 to 11 may be classified as a category 2.

The device for decoding a video may decode the first index from a bitstream in order to specify the category including at least one intra prediction pattern. In the example shown in FIG. 12, the first index may specify one of the categories 0, 1, and 2.

When the category is specified based on the first index, the intra prediction pattern of the current block may be determined based on the second index decoded from a bitstream. When the category 1 is specified by the first index, the second index may specify one of the four intra prediction patterns (i.e., the index 4 to index 7) of the category 1.

In FIG. 12, it shows that categories include the same numbers of intra prediction patterns. But there is no need to the categories include the same numbers of intra prediction patterns.

The number of available intra prediction patterns or of the number of categories may be determined in units of a sequence or a slice. Also, at least one of the number of available intra prediction patterns and the number of categories may be signaled through a sequence header or a slice header.

As another example, the number of available intra prediction patterns and/or the number of categories may be determined based on a size of a prediction unit or a coding unit of the current block. For example, when the size of the current block (e.g., the coding unit of the current block) is equal to or greater than 64×64, the intra prediction pattern of the current block may be selected from five intra prediction patterns shown in FIG. 13. In contrast, when the size of the current block (e.g., the coding unit of the current block) is less than 64×64, the intra prediction pattern of the current block may be selected from intra prediction patterns shown in FIG. 10, 11, or 12.

Figure 14:
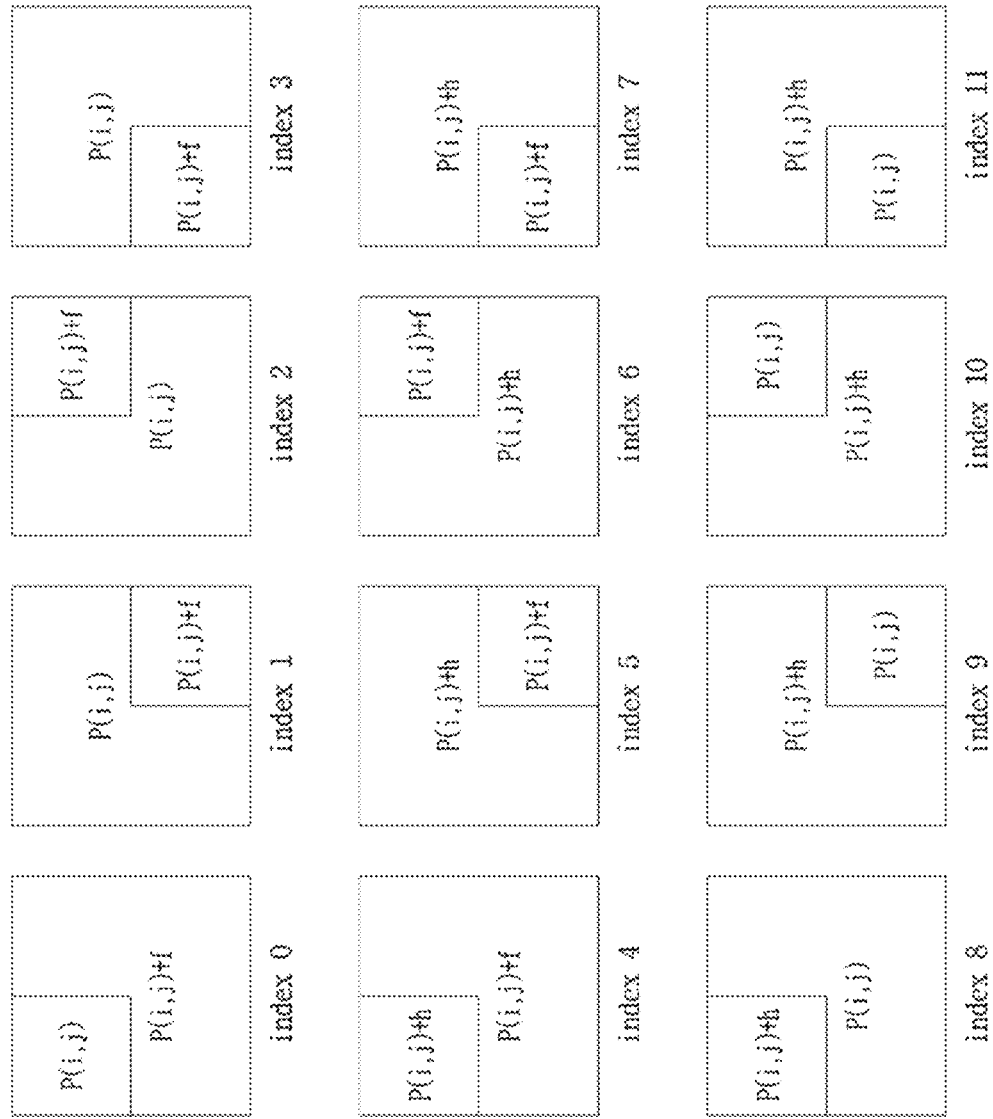

In FIGS. 10 to 13, it is depicted that the sub-blocks included in each intra prediction pattern have a rectangular shape. As another example, the intra prediction pattern where at least one of the sizes and shapes of the sub-blocks are different from each other may be used. For example, FIG. 14 is a view illustrating an example of an intra prediction pattern with different sizes and shapes of sub-blocks.

The offset for each sub-block (e.g., the offset h, f, g, or i of each sub-block shown in FIGS. 10 to 14) may be decoded from a bitstream, or may be derived from the neighboring sample adjacent to the current block.

As another example, the offset of the sub-block may be determined considering the distance from a sample at a particular position in the current block. For example, the offset may be determined in proportion to a value representing the distance between a sample at a predetermined position in the current block and a sample at a predetermined position in the sub-block.

As another example, the offset of the sub-block may be determined adding or subtracting a value determined based on the distance between a sample at a predetermined position in the current block and a sample at a predetermined position in the sub-block to or from a pre-set value.

As another example, the offset may be determined based on a ratio of a value representing the size of the current block and a value representing the distance between a sample at a predetermined position in the current block and a sample at a predetermined position in the sub-block.

Here, the sample at the predetermined position in the current block may include a sample adjacent to the left boundary of the current block, a sample positioned at the top boundary of the current block, a sample adjacent to the top left corner of the current block, etc.

Figure 15:
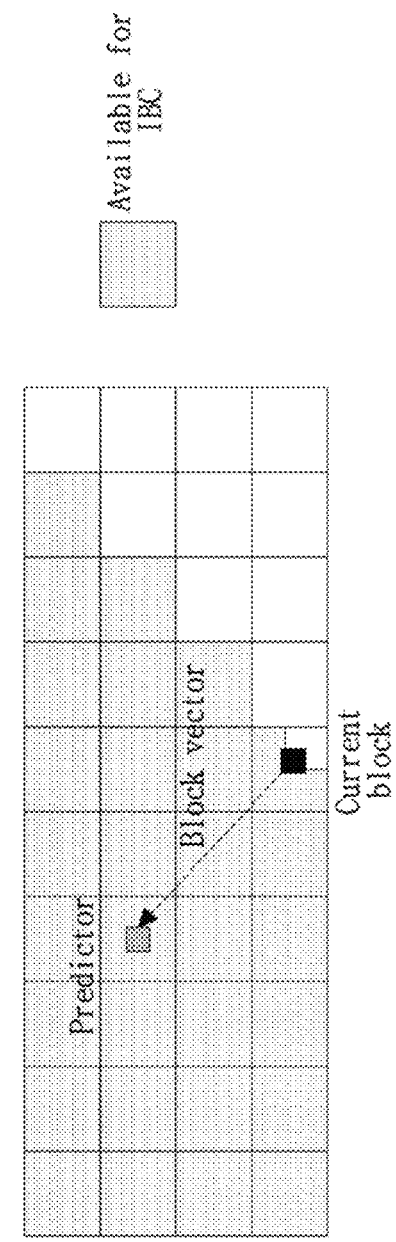
FIG. 15 is a view illustrating a method of performing prediction using an intra block copy technique according to an embodiment of the present invention.

FIG. 15 is a view illustrating a method of performing prediction using an intra block copy scheme according to an embodiment of the present invention.

Intra block copy (IBC) is a method where a current block is predicted/reconstructed using a block (hereinafter, referred to as 'a reference block') already reconstructed in the same picture as the current block. If a picture contains a large number of letters, such as Korean alphabet, an alphabet, etc. and a letter which is contained in the current block when the current block is reconstructed are contained in an already decoded block, intra block copy can enhance an encoding/decoding performance.

An intra block copy method may be classified as an intra prediction method or an inter prediction method. When the intra block copy method is classified as the intra prediction method, an intra prediction mode for the intra block copy method may be defined. When the intra block copy method is classified as the inter prediction method, a bitstream may include a flag indicating whether to apply the intra block copy method to the current block. Alternatively, whether the current block uses intra block copy may be confirmed through a reference picture index of the current block. That is, when the reference picture index of the current block indicates the current picture, inter prediction may be performed on the current block using intra block copy. To this end, a pre-reconstructed current picture may be added to a reference picture list for the current block. The current picture may exist at a fixed position in the reference picture list (e.g., a position with the reference picture index of 0 or the last position). Alternatively, the current picture may have a variable position in the reference picture list, and to this end, a reference picture index indicating a position of the current picture may be signaled, separately.

In order to specify the reference block of the current block, a position difference between the current block and the reference block may be defined as a motion vector (hereinafter, referred to as a block vector).

The block vector may be derived by a sum of a prediction block vector and a differential block vector. The device for encoding a video may generate a prediction block vector through predictive coding, and may encode the differential block vector indicating the difference between the block vector and the prediction block vector. In this case, the device for decoding a video may derive the block vector of the current block by using the prediction block vector derived using pre-decoded information and the differential block vector decoded from a bitstream.

Here, the prediction block vector may be derived based on the block vector of a neighboring block adjacent to the current block, the block vector in an LCU of the current block, the block vector in an LCU row/column of the current block, etc.

The device for encoding a video may encode the block vector without performing predictive coding of the block vector. In this case, the device for decoding a video may obtain the block vector by decoding block vector information signaled through a bitstream. The correction process may be performed on the prediction/reconstructed sample generated through the intra block copy method. In this case, the correction method described with reference to FIGS. 6 to 14 may be equally/similarly applied, and thus detailed description thereof will be omitted.

FIG. 16 shows a range of reference samples for intra prediction according to an embodiment to which the present invention is applied.

Referring to FIG. 16, intra prediction may performed by using reference samples $P(-1, -1)$, $P(-1, y)$ $(0<=y<=2N-1)$ and $P(x, -1)$ $(0<=x<=2N-1)$ located at a boundary of a current block. At this time, filtering on reference samples is selectively performed based on at least one of an intra prediction mode (e.g., index, directionality, angle, etc. of the intra prediction mode) of the current block or a size of a transform block related to the current block.

At least one of a plurality of intra filter candidates may be selected to perform filtering on reference samples. Here, the plurality of intra-filter candidates may differ from each other in at least one of a filter strength, a filter coefficient or a tap number (e.g., a number of filter coefficients, a filter length). A plurality of intra-filter candidates may be defined in at least one of a sequence, a picture, a slice, or a block level. That is, a sequence, a picture, a slice, or a block in which the current block is included may use the same plurality of intra-filter candidates.

Hereinafter, for convenience of explanation, it is assumed that a plurality of intra-filter candidates includes a first intra-filter and a second intra-filter. It is also assumed that the first intra-filter is a (1, 2, 1) 3-tap filter and the second intra-filter is a (2, 3, 6, 3, 2) 5-tap filter.

When reference samples are filtered by applying a first intra-filter, the filtered reference samples may be derived as shown in Equation 7.

$$P(-1,-1)=(P(-1,0)+2P(-1,-1)+P(0,-1)+2)>>2$$

$$P(-1,y)=(P(-1,y+1)+2P(-1,y)+P(-1,y-1)+2)>>2$$

$$P(x,-1)=(P(x+1,-1)+2P(x,-1)+P(x-1,-1)+2)>>2 \quad \text{[Equation 7]}$$

When reference samples are filtered by applying the second intra-filter, the filtered reference samples may be derived as shown in the following equation 8.

$$P(-1,-1)=(2P(-2,0)+3P(-1,0)+6P(-1,-1)+3P(0,-1)+2P(0,-2)+8)>>4$$

$$P(-1,y)=(2P(-1,y+2)+3P(-1,y+1)+6P(-1,y)+3P(-1,y-1)+2P(-1,y-2)+8)>>4$$

$$P(x,-1)=(2P(x+2,-1)+3P(x+1,-1)+6P(x,-1)+3P(x-1,-1)+2P(x-2,-1)+8)>>4 \quad \text{[Equation 8]}$$

Figure 17:
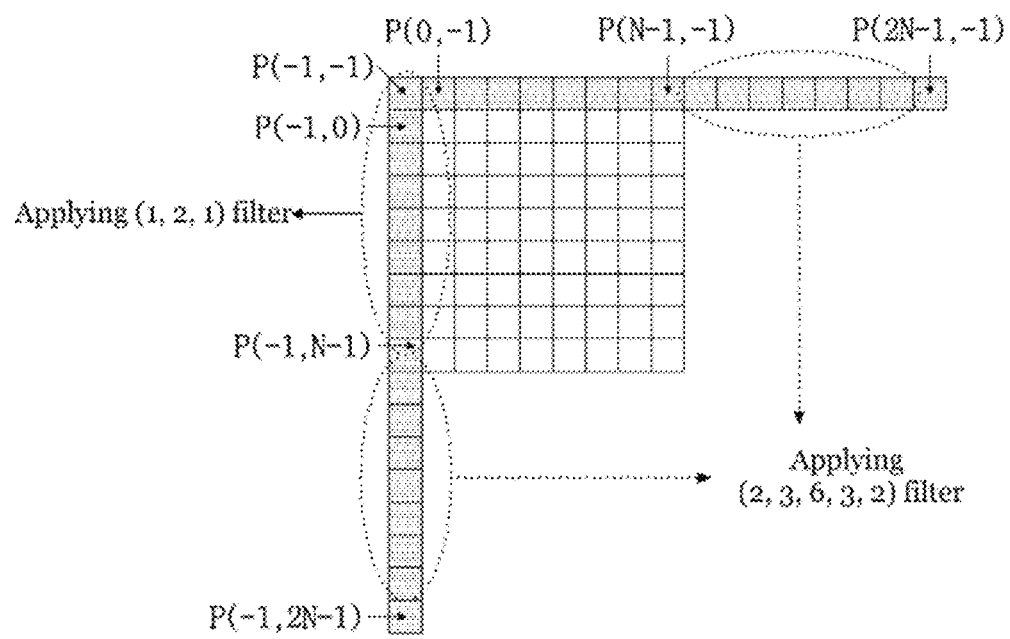
FIGS. 17 to 19 illustrate an example of filtering on reference samples.

Based on a position of a reference sample, one of a plurality of intra-filter candidates may be determined and used to perform filtering on the reference sample by using the determined one. For example, a first intra-filter may be applied to a reference sample at a boundary of a current block, and a second intra-filter may be applied to other reference samples. Specifically, as shown in FIG. 17, filtering on reference samples P (−1, −1), P (−1, 0), P (−1, 1), . . . , P (−1, N−1) and P (0, −1), P (1, −1), . . . is performed by applying a first intra-filter as shown in Equation 7, and filtering on the other reference samples is performed by applying a second reference filter as shown in Equation 8.

It is possible to select one of a plurality of intra-filter candidates based on a transform type used for a current block, and perform filtering on reference samples using the selected one. Here, the transform type may mean (1) a transform scheme such as DCT, DST or KLT, (2) a transform mode indicator such as a 2D transform, 1D transform or non-transform or (3) the number of transforms such as a first transform and a second transform. Hereinafter, for convenience of description, it is assumed that the transform type means the transform scheme such as DCT, DST and KLT.

For example, if a current block is encoded using a DCT, filtering may be performed using a first intra-filter, and if a current block is encoded using a DST, filtering may be performed using a second intra-filter. Or, if a current block is encoded using DCT or DST, filtering may be performed using a first intra-filter, and if the current block is encoded using a KLT, filtering may be performed using a second intra-filter.

Filtering may be performed using a filter selected based on a transform type of a current block and a position of a reference sample. For example, if a current block is encoded using the a DCT, filtering on reference samples P (−1, −1), P (−1, 0), P (−1, 1), . . . , P (−1, N−1) and P (0, −1), P (1, −1), . . . , P (N−1, −1) may be performed by using a first intra-filter, and filtering on other reference samples may be performed by using a second intra-filter. If a current block is encoded using a DST, filtering on reference samples P (−1, −1), P (−1, 0), P (−1, 1), . . . , P (−1, N−1) and P (0, −1), P (1, −1), . . . , P (N−1, −1) may be performed by using a second intra-filter, and filtering on other reference samples may be performed by using a first intra-filter.

One of a plurality of intra-filter candidates may be selected based on whether a transform type of a neighboring block including a reference sample is the same as a transform type of a current block, and the filtering may be performed using the selected intra-filter candidate. For example, when a current block and a neighboring block use the same transform type, filtering is performed using a first intra-filter, and when transform types of a current block and of a neighboring block are different from each other, the second intra-filter may be used to perform filtering.

It is possible to select any one of a plurality of intra filter candidates based on a transform type of a neighboring block and perform filtering on a reference sample using the selected one. That is, a specific filter may be selected in consideration of a transform type of a block in which a reference sample is included. For example, as shown in FIG. 18, if a block adjacent to left/lower left of a current block is a block encoded using a DCT, and a block adjacent to top/top right of a current block is a block encoded using a DST, filtering on reference samples adjacent to left/lower left of a current block is performed by applying a first intra filter and filtering on reference samples adjacent to top/top right of a current block is performed by applying a second intra filter.

In units of a predetermined region, a filter usable in the corresponding region may be defined. Herein, the unit of the predetermined region may be any one of a sequence, a picture, a slice, a block group (e.g., a row of coding tree units) or a block (e.g., a coding tree unit) Or, another region may be defined that shares one or more filters. A reference sample may be filtered by using a filter mapped to a region in which a current block is included.

Figures 18, 19:
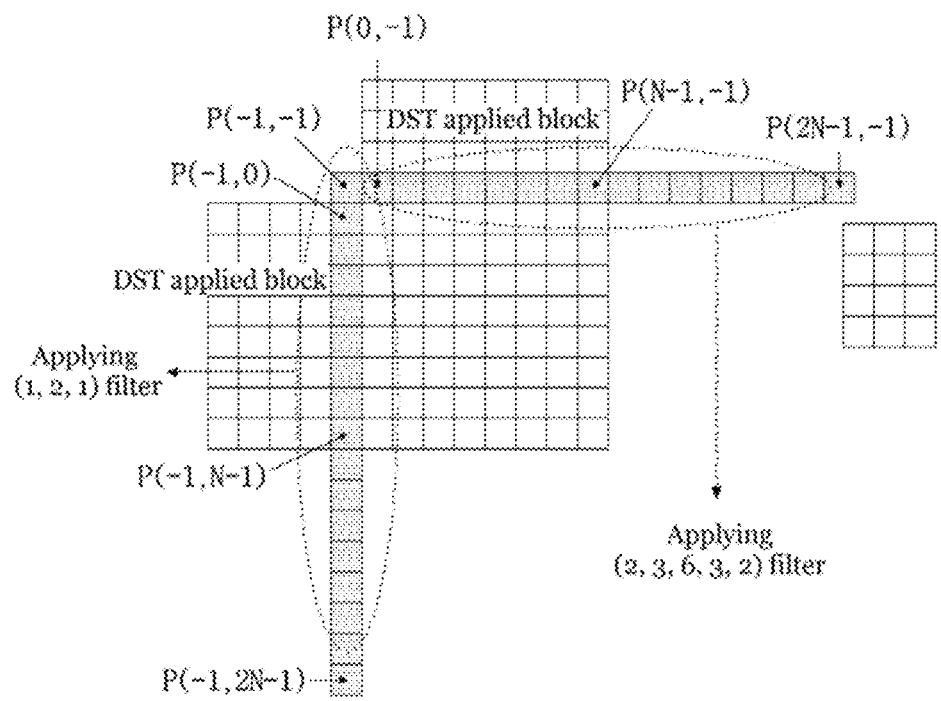

For example, as shown in FIG. 19, it is possible to perform filtering on reference samples using different filters in CTU units. In this case, information indicating whether the same filter is used in a sequence or a picture, a type of filter used for each CTU, an index specifying a filter used in the corresponding CTU among an available intra filter candidates may be signaled via a sequence parameter set (SPS) or a picture parameter set (PPS).

An intra-prediction mode may be effectively used when a current picture has no continuity with a previous picture or when a current picture includes a texture having directionality. Particularly, when a current picture includes a texture having directionality, an intra-prediction mode of the current block is likely to have the identical or similar direction as an intra-prediction mode of a neighboring block. Accordingly, an intra-prediction mode of a current block may be encoded/decoded based on an intra-prediction mode of a neighboring block. Specifically, an intra-prediction mode of a current block may be encoded/decoded based on a plurality of MPM (Most Probable mode) candidates generated based on an intra-prediction mode of a neighboring block.

For example, in encoding process, when an intra-prediction mode of a current block is identical to any one of MPM candidates, the intra-prediction mode of the current block may be encoded by selecting an MPM candidate identical to the intra-prediction mode of the current block. Here, the encoder may encode index information (e.g., 'mpm_idx') indicating an MPM candidate identical to an intra-prediction mode of a current block among a plurality of MPM candidates. The index information may be signaled through a bitstream.

In decoding process, an intra-prediction mode of the current block may be derived by information indicating whether any one of MPM candidates is used as an intra-prediction mode of a current block, and by index information (e.g., 'mpm_idx'). Here, information indicating whether any one of MPM candidates is used as the intra-prediction mode of a current block may be a 1-bit flag (e.g., 'prev_intra_luma_pred_flag'), but is not limited thereto.

For deriving an intra-prediction mode of a current block, a plurality of MPM candidates may be used. A number of MPM candidates may be a fixed number, and may be a variable number per a sequence, a slice, or a target block to be decoded.

For example, a number of MPM candidates may be determined based on information signaled from a bitstream. A number of MPM candidates may be determined per sequence/slide by a syntax element, 'num_mpm_idx,' signaled by unit of a sequence/slice.

A number of MPM candidates used for deriving an intra-prediction mode of a current block may be a number from 3 to 6, but is not limited thereto. It is also possible to use more than 6 MPM candidates.

Hereinafter, assuming that extended intra-prediction modes illustrated in FIG. 4 are used, a method for deriving an intra-prediction mode of a current block using MPM candidates will be described in detail. The embodiments described below may be applied not only when a larger number of intra-prediction modes than those shown in FIG. 4 are used but also when a smaller number of intra-prediction modes than those shown in FIG. 4 are used.

Figure 20:
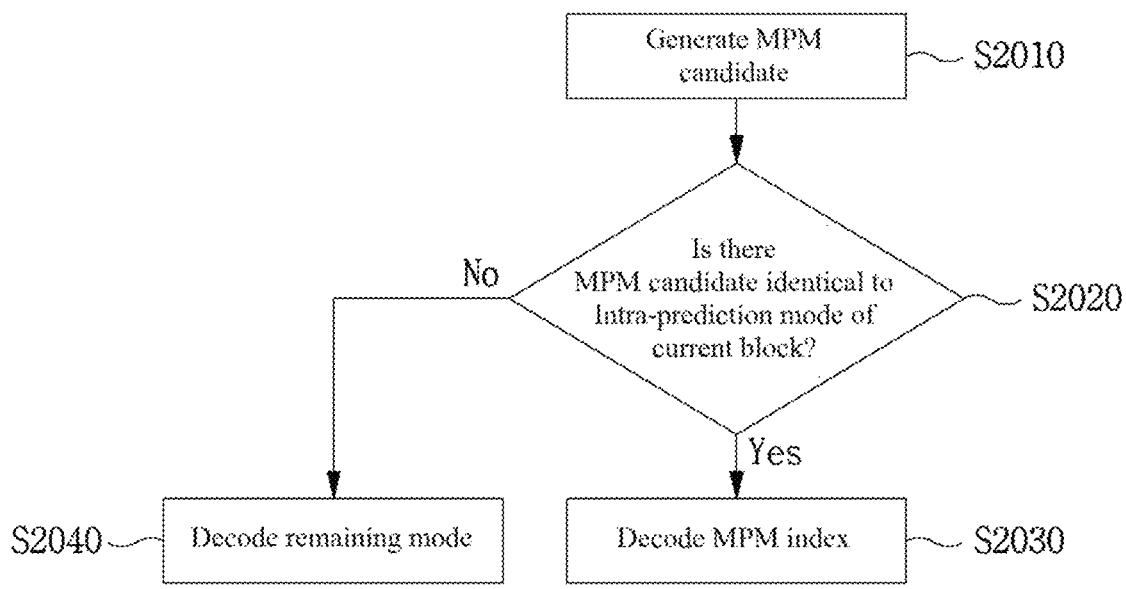
FIG. 20 is a flowchart illustrating a method of deriving an intra-prediction mode of a current block, according to an embodiment of the present invention.

FIG. 20 is a flowchart illustrating a method of deriving an intra-prediction mode of a current block, according to an embodiment of the present invention.

Referring to FIG. 20, firstly, MPM candidates are derived using an intra-prediction mode of a neighboring block adjacent to a current block (S2010). Here, a neighboring block adjacent to a current block may be blocks that have been decoded earlier than a current block, and may include a top neighboring block adjacent to top of a current block, and a left neighboring block adjacent to left of a current block.

Here, a top neighboring block adjacent to a top side of a current block may include not only a neighboring block adjoining to a top boundary of a current block but also a neighboring block adjacent to top corner of a current block (e.g., a left top corner of a current block or a right top corner of a current block). In addition, when a top boundary of a current block is extended by a predetermined length, a block adjoining to an extended top boundary or a block including coordinates corresponding to an extended top boundary may be referred to as a top neighboring block of a current block.

A left neighboring block adjacent to a left side of a current block may include not only a neighboring block adjoining to a left boundary of a current block but also a neighboring block adjacent to left corner of a current block (e.g., a left top corner of a current block or a left bottom corner of a current block). In addition, when a left boundary of a current block is extended by a predetermined length, a block adjoining to an extended left boundary or a block including coordinates corresponding to an extended left boundary may be referred to as a left neighboring block of a current block.

MPM candidates of a current block may be generated using at least one of an intra-prediction mode having a highest occurrence frequency among intra-prediction modes of neighboring blocks adjacent to a current block, an intra-prediction mode having a largest value among intra-prediction modes of neighboring blocks adjacent to a current block or an intra-prediction mode having a smallest value among intra-prediction modes of neighboring blocks adjacent to a current block.

For example, Table 3 shows an example in which MPM candidates are determined based on intra-prediction mode of neighboring blocks.

In Table 3, L indicates an intra-prediction mode having a highest occurrence frequency among intra-prediction modes of left neighboring blocks, and A indicates an intra-prediction mode having a highest occurrence frequency among intra-prediction modes of top neighboring blocks. Max indicates a largest intra-prediction mode among intra-prediction modes of left neighboring blocks and top neighboring blocks, and Min indicates a smallest intra-prediction mode of the intra-prediction modes of left neighboring blocks and top neighboring blocks. In Table 3, it is exemplified that 6 MPM candidates are generated. However, it is also possible to derive an intra-prediction mode of a current block by generating fewer or more MPM candidates.

In addition, instead of determining L or A based on occurrence frequency of an intra-prediction mode, an intra-prediction mode of a neighboring block at a specific position may be determined as L or A.

Referring to an example shown in Table 3, MPM candidates may be determined based on whether an intra-prediction modes L and A are identical.

For example, when L and A are identical, and L and A are directional modes (i.e., neither Planar nor DC), MPM candidates of a current block may include at least one of L, an intra-prediction mode having a direction similar to L, a Planar mode and a DC mode. Here, an intra-prediction mode having a direction similar to an intra-prediction mode L means an intra-prediction mode in which a difference from the intra-prediction mode L is equal to or less than a threshold value. For example, an intra-prediction mode similar to an intra-prediction mode L may include L+1, L−1, L+2, or L−2, and so on. In Table 3, it is exemplified that 6 MPM candidates such as L, Planar, L+1, L−1, L+2 and DC are generated.

When L and A are identical, and L and A are non-directional modes (i.e., Planar or DC), MPM candidates of a current block may include at least one of a Planer mode, a DC mode and a pre-set directional mode. Here, a pre-set directional mode may include Vertical and Horizontal, and may include diagonal directional modes (e.g., 2, 34 or 66, etc.). Alternatively, a pre-set directional mode may have a direction different from the examples above. In Table 3, it is exemplified that 6 MPM candidates such as Planar, DC, Vertical (Ver), Horizontal (Hor), 2, and 18 are generated.

When L and A are not identical, each of L and A may be set as an MPM candidate. In addition, based on whether L and A are non-directional modes, at least one of Planar, DC, Max, an intra-prediction mode similar to Max, Min or an intra-prediction mode similar to Min may be generated as an MPM candidate.

For example, when L and A are not identical, and L and A are not Planar modes, but L or A is DC, at least one of L, A, Planar, Max or an intra-prediction mode similar to Max may be generated as an MPM candidate. In Table 3, it is exemplified that 6 MPM candidates such as L, A, Planar, Max−1, Max+1 and Max+2 are generated.

TABLE 3

| Condition | | | MPM0 (mpm_id x = 0) | MPM1 (mpm_id x = 1) | MPM2 (mpm_id x = 2) | MPM3 (mpm_id x = 3) | MPM4 (mpm_id x = 4) | MPM5 (mpm_id x = 5) |
|---|---|---|---|---|---|---|---|---|
| L = A | L ≠ planar & L ≠ DC | | L | Planar | L + 1 | L − 1 | L + 2 | DC |
| | Otherwise | | planar | DC | Ver | Hor | 2 | 18 |
| L ≠ A | L ≠ planar & R ≠ planar | L = DC or A = DC | L | A | Planar | Max − 1 | Max + 1 | Max + 2 |
| | | otherwise | L | A | Planar | DC | Max + 1 | Min − 1 |
| | otherwise | L + A < 2 | L | A | Ver | Hor | 2 | 18 |
| | | otherwise | L | A | DC | Max − 1 | Max + 1 | Max + 2 |

When L and A are not identical, and L and A are neither Planar nor DC, at least one of L, A, non-directional mode, Max, Min, an intra-prediction mode similar to Max or an intra-prediction mode similar to Min may be generated as an MPM candidate. In Table 3, it is exemplified that 6 MPM candidates such as L, A, Planar, DC, Max+1, and Min−1 are generated.

When L and A are not identical but both of L and A are non-directional modes (i.e., one of L and A is Planar and the other is DC, that is, L+A<2), L, A and pre-set directional mode may be generated as an MPM candidate. In Table 3, it is exemplified that 6 MPM candidates such as L, A, Vertical (Ver), Horizontal (Hor), 2 and 18 are generated.

When L and A are not identical, one of L and L is a Planar mode and the other is a directional mode, at least one of L, A, DC, Max or an intra-prediction mode similar to Max may be generated as an MPM candidate. In Table 3, it is exemplified that 6 MPM candidates such as L, A, DC, Max−1, Max+1 and Max+2 are generated.

Hereinafter, referring to examples of FIG. 21, examples for generating MPM candidates will be described in detail.

Figure 21:
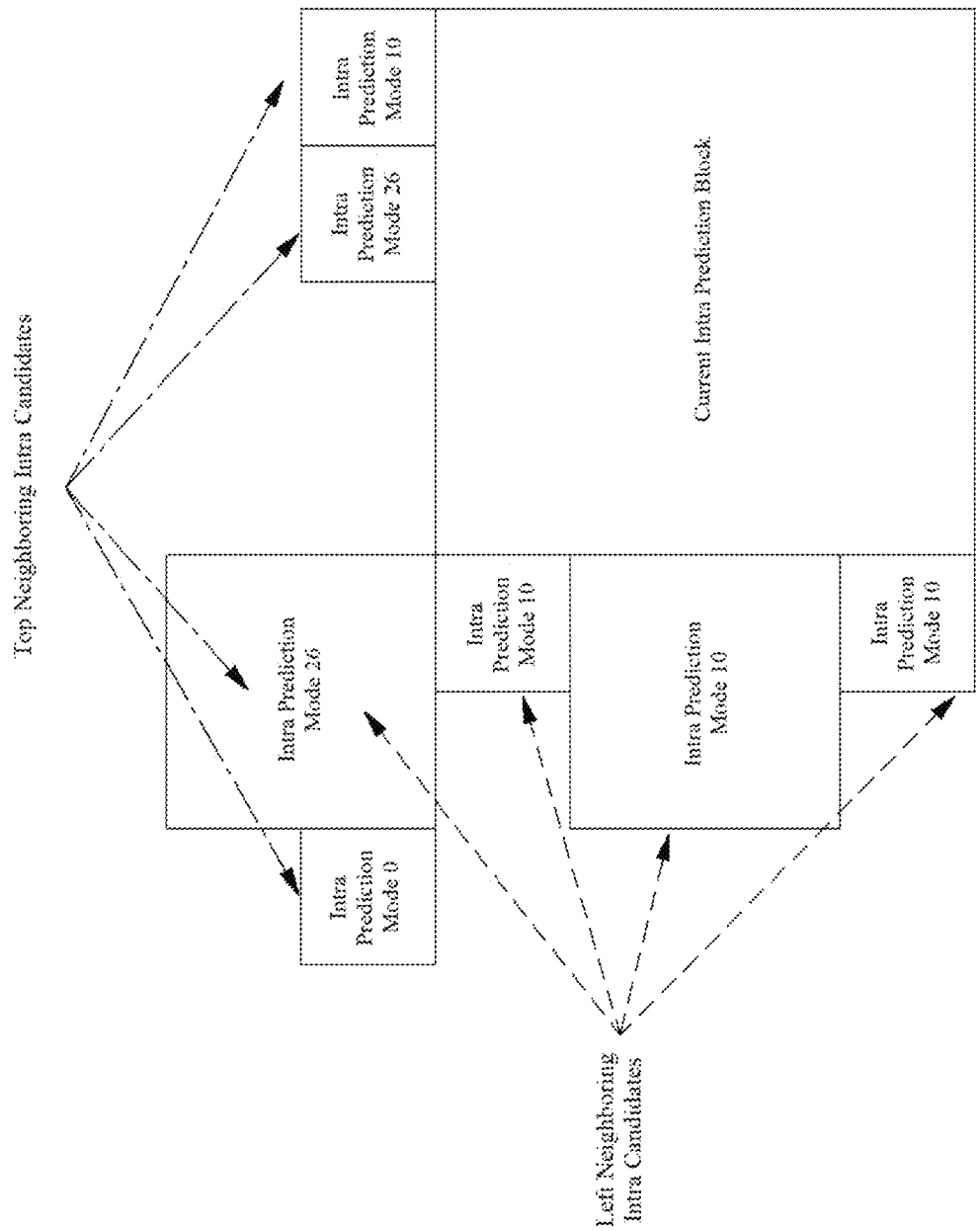
FIG. 21 is a diagram for explaining an example in which an MPM candidate is generated using an intra-prediction mode of a neighboring block adjacent to a current block.

FIG. 21 is a diagram for explaining an example in which an MPM candidate is generated using an intra-prediction mode of a neighboring block adjacent to a current block.

In FIG. 21, it is exemplified that a plurality of left neighboring blocks and a plurality of top neighboring blocks adjacent to the current block are present.

Referring to FIG. 21, an intra-prediction mode 'L' having a highest occurrence frequency among intra-prediction modes of left neighboring blocks is 10. An intra-prediction mode 'A' having a highest occurrence frequency among intra-prediction modes of top neighboring blocks is 26. In addition, a largest intra-prediction mode 'Max' for left neighboring blocks and top neighboring blocks is 26, and a smallest intra-prediction mode 'Min' for left neighboring blocks and top neighboring blocks is 0. Applying the above to the example shown in Table 3, 10, 26, Planar, 25, 27 and 29 may be generated as MPM candidates for a current block.

A neighboring block used to generate MPM candidates of a current block may be limited to neighboring blocks included in a same coding tree unit as a current block. Here, a current block is adjacent to a left and top boundaries of a coding tree unit, and there may be no neighboring block adjacent to left or top of the current block in the coding tree unit. Alternatively, when a neighboring block adjacent to left or top of a current block may not be a block encoded by intra-prediction mode, an intra-prediction mode of the neighboring block adjacent to the current block may not be used. In this case, MPM candidates of a current block may be generated based on predefined modes. Here, the predefined modes may include at least one of DC, Planar, Vertical, or Horizontal.

For example, when there is no left neighboring blocks and top neighboring blocks adjacent to a current block, it is assumed that L is Planar and A is DC, and MPM candidates of the current block are generated according to rules exemplified in Table 3.

An intra-prediction modes of one of top neighboring blocks and left neighboring blocks may be used when generating MPM candidates, while the other may not be available when generating MPM candidates. An unavailable intra-prediction mode may be replaced with an available intra-prediction mode, thereby MPM candidates of a current block may be generated.

Specifically, for generating MPM candidates of a current block, when an intra-prediction mode of a top neighboring block or an intra-prediction mode of a left neighboring block is not available, MPM candidates of the current block may be generated based on a block closest to a neighboring block of which intra-prediction mode is unavailable or an intra-prediction mode of a block most adjacent to a neighboring block of which intra-prediction mode is unavailable.

For example, when an intra-prediction mode of a top neighboring block of a current block is not available, an intra-prediction mode of a left neighboring block closest (or most adjacent) to the top neighboring block may be used instead of the intra-prediction mode of the top neighboring block. In addition, when an intra-prediction mode of a left neighboring block of a current block is not available, an intra-prediction mode of a top neighboring block closest (or most adjacent) to the left neighboring block may be used instead of the intra-prediction mode of the left neighboring block.

Figure 22A:
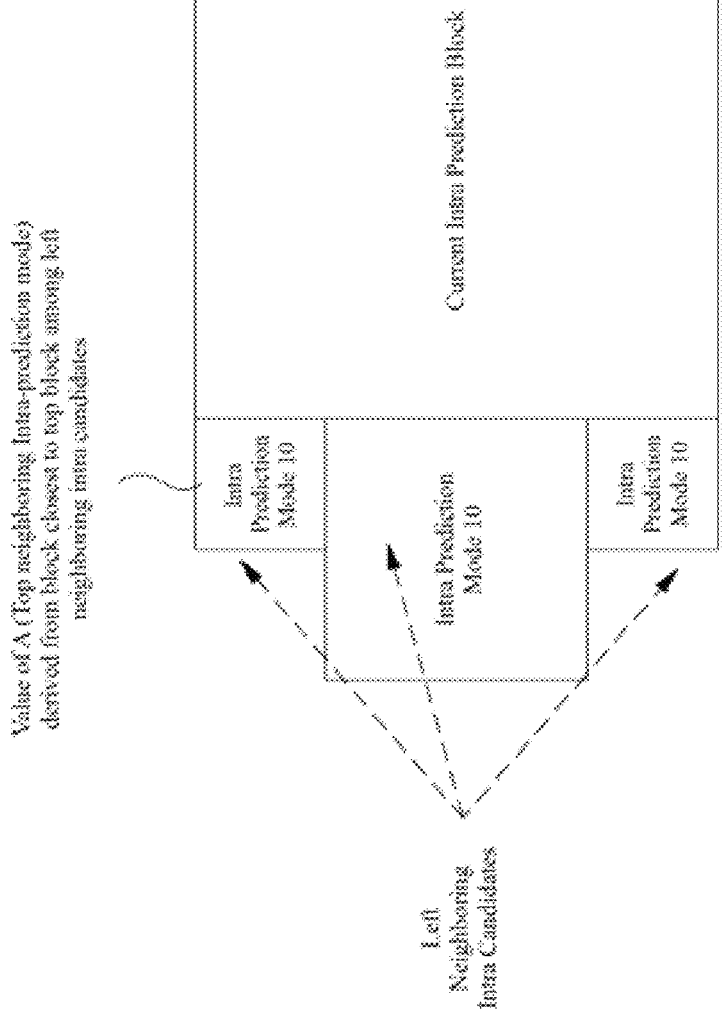
FIGS. 22A and 22B are a diagram showing an example of generating MPM candidates when an intra-prediction mode of a top neighboring block or a left neighboring block adjacent to a current block is not available.
Figure 22B:
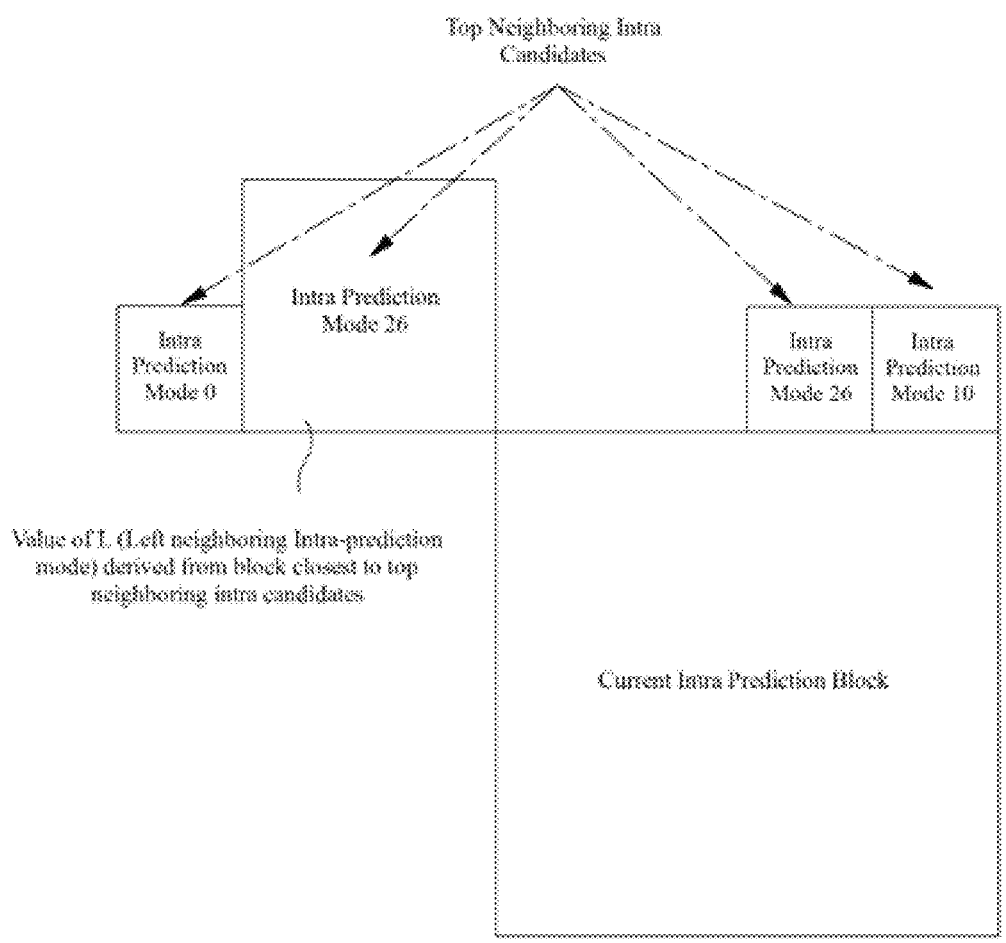

FIGS. 22A and 22B are a diagram showing an example of generating MPM candidates when an intra-prediction mode of a top neighboring block or a left neighboring block adjacent to a current block is not available.

When an intra-prediction mode of a top neighboring block is not available, an intra-prediction mode of a left neighboring block closest to the top neighboring block (i.e., a block closest to a top boundary of a current block) among left neighboring blocks of a current block may be set as an intra-prediction mode A.

For example, referring to an example shown in FIG. 22A, an intra-prediction mode L having a highest occurrence frequency among intra-prediction modes of left neighboring blocks is 10, and an intra-prediction mode A is 10 which is an intra-prediction mode of a left neighboring block closest to a top neighboring block. When A and L are determined, MPM candidates of a current block may be determined according to examples of Table 3.

When an intra-prediction mode of a top neighboring block is not available but there are a plurality of left neighboring blocks adjacent to a current block, a decoder may sequentially obtain intra-prediction modes of the left neighboring blocks. That is, a decoder may obtain intra-prediction modes of left neighboring blocks in an order of adjacent to a top neighboring block (or top left neighboring block of a current block).

Figure 23A:
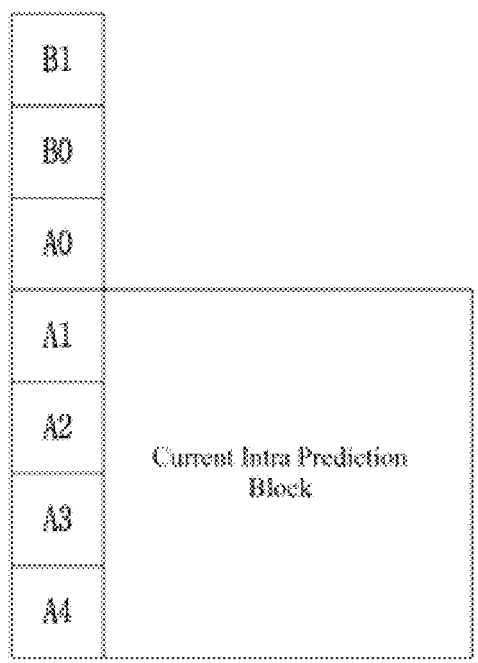
FIGS. 23A and 23B are a diagram for explaining an order of obtaining intra-prediction modes of neighboring blocks.

For example, in an example shown in FIG. 23A, a decoder may obtain sequentially, starting from a top left block of a current block, intra-prediction modes of neighboring blocks located below the top left block, and then, may obtain intra-prediction modes of neighboring blocks located above the top left block. Accordingly, in an example shown in FIG. 23A, an intra-prediction mode of left neighboring blocks are obtained in an order of A0, A1, A2, A3, A4, B0, B1, among which a firstly available intra-prediction mode may be used instead of an intra-prediction mode (or intra-prediction mode A) of the top neighboring block.

When an intra-prediction mode of a left neighboring block is not available, an intra-prediction mode of a block closest to the left neighboring block (i.e., a block closest to a left boundary of a current block) among top neighboring blocks of a current block may be set as an intra-prediction mode L.

For example, referring to an example shown in FIG. 22B, an intra-prediction mode A having a highest occurrence frequency among intra-prediction modes of top neighboring blocks is 26, and an intra-prediction mode L is 26 which is an intra-prediction mode of a left neighboring block closest to a left neighboring block. When L and A are determined, MPM candidates of a current block may be determined according to examples of Table 3.

When an intra-prediction mode of a left neighboring block is not available but there are a plurality of top neighboring blocks adjacent to a current block, a decoder may sequentially obtain intra-prediction modes of the top neighboring blocks. That is, a decoder may obtain intra-prediction modes of top neighboring blocks in an order of adjacent to a left neighboring block (or top left neighboring block of a current block).

Figure 23B:
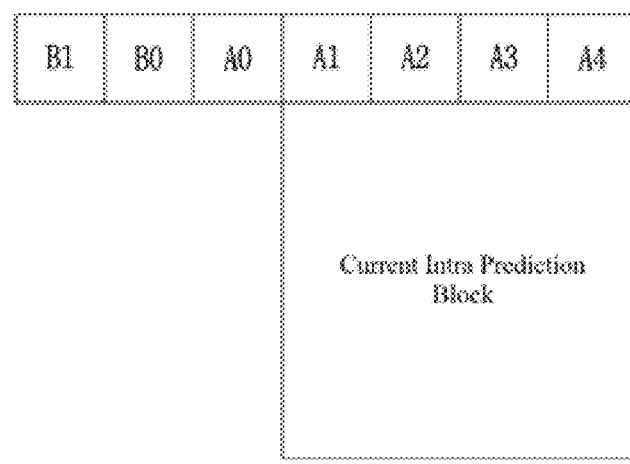

For example, in an example shown in FIG. 23B, a decoder may obtain sequentially, starting from a top left block of a current block, intra-prediction modes of neighboring blocks located at right side of the top left block, and then, may obtain intra-prediction modes of neighboring blocks located at left side of the top left block. Accordingly, in an example shown in FIG. 23B, an intra-prediction mode of top neighboring blocks are obtained in an order of A0, A1, A2, A3, A4, B0, B1, among which a firstly available intra-prediction mode may be used instead of an intra-prediction mode (or intra-prediction mode L) of the left neighboring block).

For an additional example, when an intra-prediction mode of a top neighboring block is not available, an intra-prediction mode having a highest occurrence frequency among intra-prediction modes of left neighboring blocks may be used instead of an intra-prediction mode of top neighboring block. For example, referring to an example shown in FIG. 23A, it is possible to use an intra-prediction mode having a highest occurrence frequency among intra-prediction modes of blocks A0, A1, A2, A3, A4, B0 and B1 instead of an intra-prediction mode (or intra-prediction mode A) of the top neighboring block.

In addition, when an intra-prediction mode of a left neighboring block is not available, an intra-prediction mode having a highest occurrence frequency among intra-prediction modes of top neighboring blocks may be used instead of an intra-prediction mode of left neighboring block. For example, referring to an example shown in FIG. 23B, it is possible to use an intra-prediction mode having a highest occurrence frequency among intra-prediction modes of blocks A0, A1, A2, A3, A4, B0 and B1 instead of an intra-prediction mode (or intra-prediction mode L) of the left neighboring block.

When MPM candidates of a current block are generated, it is determined whether there is an MPM candidate identical to an intra-prediction mode of a current block (S2020). Here, whether there is an MPM candidate identical to a intra-prediction mode of a current block may be indicated by information (e.g., 'prev_intra_pred_flag') signaled through a bitstream. For example, prev_intra_pred_flag having value of 1 indicates that there is an MPM candidate identical to an intra-prediction mode of a current block, and prev_intra_pred_flag having a value of 0 indicates that there is no MPM candidate identical to an intra-prediction mode of the a current block.

When it is determined that there is an MPM candidate identical to an intra-prediction mode of a current block, information specifying the MPM candidate identical to the intra-prediction mode of the current block may be decoded (S2030), and based on the information, an intra-prediction mode of a current block may be determined.

On the other hand, when it is determined that there is no MPM candidate identical to an intra-prediction mode of a current block, a remaining mode is decoded from a bitstream (S2040), and an intra-prediction mode of a current block may be determined based on the decoded remaining mode. A remaining mode is information being encoded to specify an intra-prediction mode of a current block, except for MPM candidates among intra-prediction modes. A decoder may determine an intra-prediction mode of a current block by comparing a remaining mode and MPM candidates.

When an extended intra-prediction mode is used, as a number of intra-prediction modes increases, a number of bits used for encoding a remaining mode may also increase. For example, assuming that 67 intra-prediction modes are used and 6 MPM candidates are used, a remaining mode should be long enough to represent 61 intra-prediction modes. For example, when a remaining mode is assumed to be encoded as a fixed length, the remaining mode should have a length of at least 6 bits to represent the 61 intra-prediction modes.

Accordingly, in order to minimize signaling of a remaining prediction mode and more efficiently encode/decode an intra-prediction mode of a current block, an intra-prediction mode of a current block may be derived using a plurality of MPM candidate groups.

Hereinafter, a method for deriving an intra-prediction mode of a current block using a plurality of MPM candidate groups will be described in detail.

Figure 24:
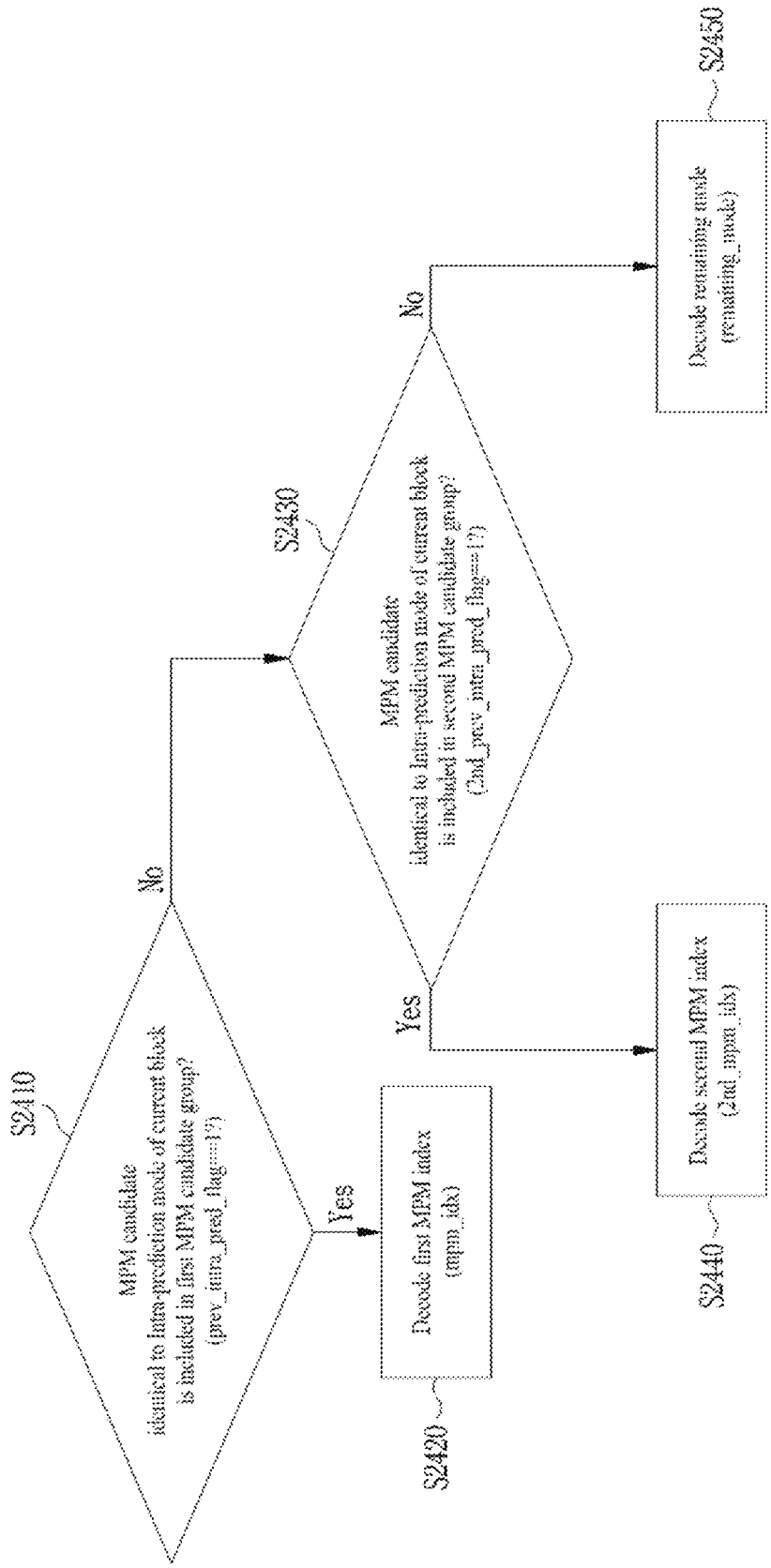
FIG. 24 shows an example of deriving an intra-prediction mode of a current block, using 2 MPM candidate groups.
Figure 25:
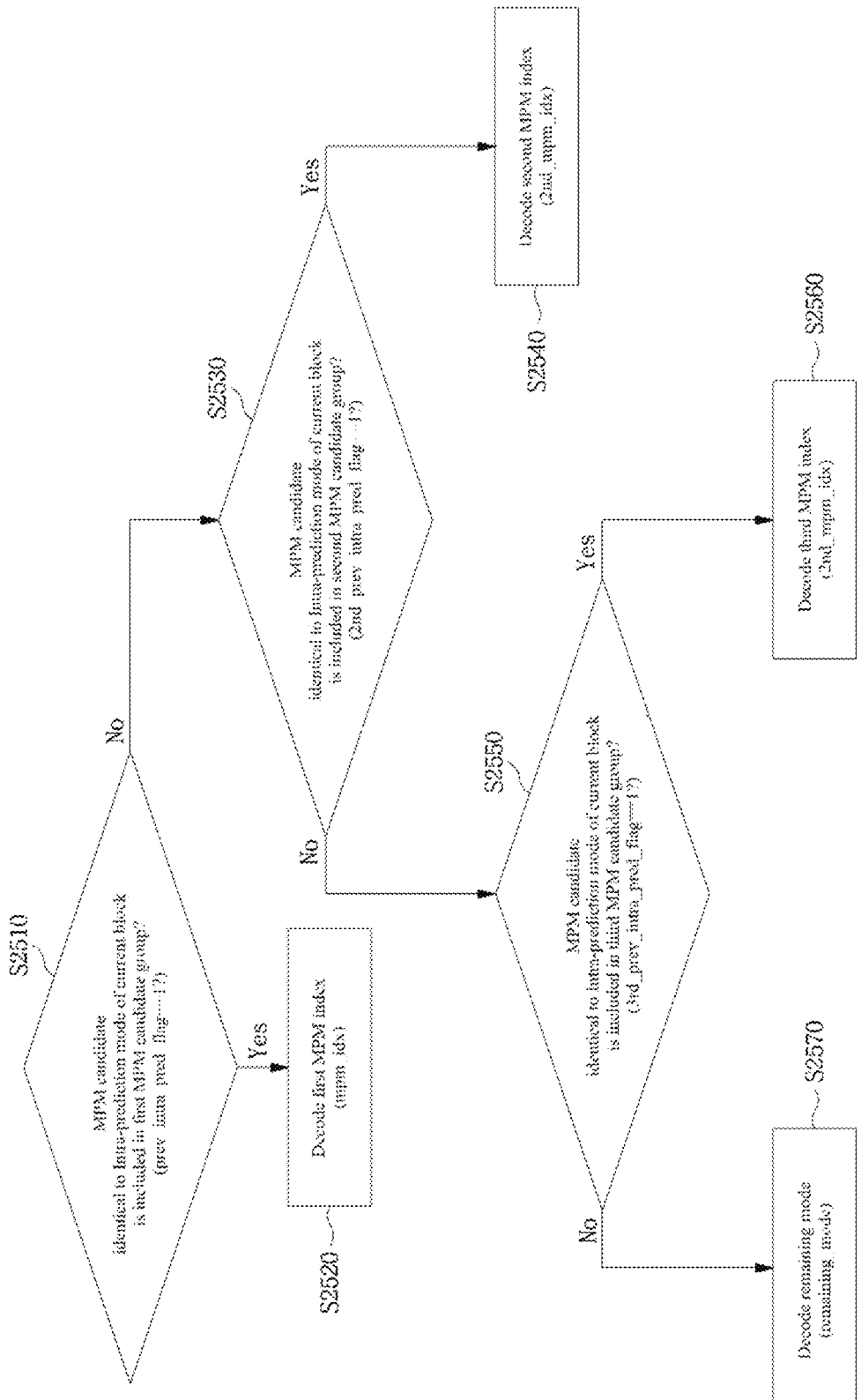
FIG. 25 shows an example of deriving an intra-prediction mode of a current block, using 3 MPM candidate groups.

FIG. 24 shows an example of deriving an intra-prediction mode of a current block using 2 MPM candidate groups, FIG. 25 shows an example of deriving an intra-prediction mode of a current block using 3 MPM candidate groups.

Referring to FIG. 24, a decoder may determine based on a bitstream whether a MPM candidate identical to an intra-prediction mode of a current block is included in a first MPM candidate group (S2410). Here, whether or not an MPM candidate identical to an intra-prediction mode of a current block is included in a first MPM candidate group may be indicated by first information (e.g., 'prev_intra_pred_flag') signaled through a bitstream.

When it is determined that an MPM candidate identical to an intra-prediction mode of a current block is included in a first MPM candidate group, information (e.g., 'mpm_idx') specifying an MPM candidate identical to a intra-prediction mode of a current block in a first MPM candidate group (S2420) may be decoded, and an intra-prediction mode of a current block may be determined based on the information.

On the other hand, when it is determined that an MPM candidate identical to an intra-prediction mode of a current block is not included in a first MPM candidate group, it may be determined whether an MPM candidate identical to an intra-prediction mode of a current block is included in a second MPM candidate group (S2430). Here, whether or not an MPM candidate identical to an intra-prediction mode of a current block is included in a second MPM candidate group may be indicated by second information (e.g., '2nd_prev_intra_pred_flag') signaled through a bitstream.

When it is determined that an MPM candidate identical to an intra-prediction mode of a current block is included in a second MPM candidate group, information (e.g., '2nd_mpm_idx') specifying an MPM candidate identical to an intra-prediction mode of a current block in a second MPM candidate group may be decoded (S2440), and an intra-prediction mode of a current block may be determined based on the information.

On the other hand, when it is determined that none of a first MPM candidate group and a second MPM candidate group include an MPM candidate identical to an intra-prediction mode of a current block, a remaining mode is decoded from a bitstream (S2450), and an intra-prediction mode of a current block may be determined based on the decoded remaining mode.

Here, a first MPM candidate group may include an MPM candidate generated based on intra-prediction modes of neighboring blocks of a current block. For example, a first MPM candidate group may include 6 MPM candidates generated through an example of Table 3.

A second MPM candidate group may include an MPM candidate not included in a first MPM candidate group. For example, in Table 3, when L and A are identical, and L and A are directional modes, a first MPM candidate group may include MPM candidates corresponding to Planar, DC, Vertical, Horizontal, 2 and 18. Accordingly, a second MPM candidate group may include MPM candidates other than Planar, DC, Vertical, Horizontal, 2 and 18.

A second MPM candidate group may include a pre-set intra-prediction mode or an MPM candidate generated based on MPM candidates included in a first MPM candidate group. For example, a second MPM candidate group may include an MPM candidate having a direction similar to a directional MPM candidate included in a first MPM candidate group.

For an additional example, one of a first MPM candidate group and a second MPM candidate group is generated based on an intra-prediction mode of a left neighboring block of a current block, and the other is generated based on an intra-prediction mode of a top neighbor block of a current block.

A number of MPM candidates included in a second MPM candidate group may be equal to or greater than a number of MPM candidates included in a first MPM candidate group. For example, a first MPM candidate group may include maximum of 6 MPM candidates, while a second MPM candidate group may include maximum of 16 MPM candidates.

When maximum of 6 MPM candidates are included in a first MPM candidate group, information (e.g., 'mpm_idx') for identifying an MPM candidate included in a first MPM candidate group may be encoded as a fixed length of 3 bits. On the other hand, when a maximum of 16 MPM candidates are included in a second MPM candidate group, information (e.g., '2nd_mpm_idx') for identifying an MPM candidate included in a second MPM candidate group may be encoded as a fixed length of 4 bits. When 6 MPM candidates are included in a first MPM candidate group and 16 MPM candidates are included in a second MPM candidate group, the remaining mode is encoded as a fixed length of 6 bits to identify 45 intra-prediction modes.

Referring to FIG. 25, a decoder may determine based on a bitstream whether an MPM candidate identical to an intra-prediction mode of a current block is included in a first MPM candidate group (S2510). Here, whether or not an MPM candidate identical to an intra-prediction mode of a current block is included in a first MPM candidate group may be indicated by first information (e.g., 'prev_intra_pred_flag') signaled through a bitstream.

When it is determined that an MPM candidate identical to an intra-prediction mode of a current block is included in a first MPM candidate group, information (e.g., 'mpm_idx') specifying an MPM candidate identical to a intra-prediction mode of a current block in a first MPM candidate group (S2520) may be decoded, and an intra-prediction mode of a current block may be determined based on the information.

On the other hand, when it is determined that an MPM candidate identical to an intra-prediction mode of a current block is not included in a first MPM candidate group, it may be determined whether an MPM candidate identical to an intra-prediction mode of a current block is included in a second MPM candidate group (S2530). Here, whether or not an MPM candidate identical to an intra-prediction mode of a current block is included in a second MPM candidate group may be indicated by second information (e.g., '2nd_prev_intra_pred_flag') signaled through a bitstream.

When it is determined that an MPM candidate identical to an intra-prediction mode of a current block is included in a second MPM candidate group, information (e.g., '2nd_mpm_idx') specifying an MPM candidate identical to an intra-prediction mode of a current block in a second MPM candidate group may be decoded (S2540), and an intra-prediction mode of a current block may be determined based on the information.

On the other hand, when it is determined that an MPM candidate identical to an intra-prediction mode of a current block is not included in a second MPM candidate group, it may be determined whether an MPM candidate identical to an intra-prediction mode of a current block is included in a third MPM candidate group (S2550). Here, whether or not an MPM candidate identical to an intra-prediction mode of a current block is included in a third MPM candidate group may be indicated by second information (e.g., '3rd_prev_intra_pred_flag') signaled through a bitstream.

When it is determined that an MPM candidate identical to an intra-prediction mode of a current block is included in a third MPM candidate group, information (e.g., '3rd_mpm_idx') specifying an MPM candidate identical to an intra-prediction mode of a current block in a third MPM candidate group may be decoded (S2540), and an intra-prediction mode of a current block may be determined based on the information.

On the other hand, when it is determined that none of a first MPM candidate group, a second MPM candidate group and a third MPM candidate group include an MPM candidate identical to an intra-prediction mode of a current block, a remaining mode is decoded from a bitstream (S2570), and an intra-prediction mode of a current block may be determined based on the decoded remaining mode.

A third MPM candidate group may include an MPM candidate not included in either a first MPM candidate group or a second MPM candidate group. MPM candidates included in a third MPM candidate group may be generated based on the pre-set intra-prediction mode, MPM candidates included in a first MPM candidate group or MPM candidates included in a second MPM candidate group. For example, a third MPM candidate group may include an MPM candidate having a direction similar to a directional MPM candidate included in a first MPM candidate group or a first MPM candidate group.

A number of MPM candidates included in a third MPM candidate group may be equal to or greater than a number of MPM candidates included in a first MPM candidate group. In addition, a number of MPM candidates included in a third MPM candidate group may be equal to or greater than a number of MPM candidates included in a second MPM candidate group. For example, a first MPM candidate group may include 6 MPM candidates, while a second MPM candidate group and a third MPM candidate group may include 16 MPM candidates.

When a third MPM candidate group includes 16 MPM candidates, information (e.g., '3rd_mpm_idx') for identifying MPM candidate included in a third MPM candidate group may be encoded as a fixed length of 4 bits. When a first MPM candidate group includes 6 MPM candidates, and each of a second MPM candidate group and a third MPM candidate group includes 16 MPM candidates, a remaining mode may be encoded as a fixed length of 5 bits to identify 29 intra-prediction modes.

Referring to FIGS. 24 and 25, it is illustrated that an intra-prediction mode of a current block is obtained using 2 and 3 MPM candidate groups, respectively. A number of MPM candidate groups used to derive an intra-prediction mode of a current block is not limited to the examples described. In addition, a number of MPM candidates included in a first to third MPM candidate groups is not limited to the examples described.

Whether or not to use a plurality of MPM candidate groups may be determined based on information signaled in units of a sequence, a picture, a slice, a unit to be encoded/decoded. Here, the information may be information indicating a maximum number of MPM candidates or flag information indicating whether to use a plurality of MPM candidate groups.

When an intra-prediction mode of a current block is determined, intra-prediction may be performed using a reference sample adjacent to the current block. For example, prediction samples of a current block may be generated by averaging reference samples, or may be generated by duplicating reference samples in a specific direction considering a directionality of an intra-prediction mode. As described above in an example referring to FIG. 16, $P(-1, -1)$, $P(-1, y)$ ($0 \leq y \leq 2N-1$), $P(x, -1)$ ($0 \leq x \leq 2N-1$) which are located at a boundary of a current block may be used as reference samples.

When it is determined that a reference sample is not available, a reference sample that is not available may be replaced with a reference sample that is available. Here, a reference sample may be determined as unavailable in case where a position of a reference sample is outside a picture, a reference sample is present in a slice different from a current block, or a reference sample is included in a block encoded by an inter-prediction. Here, whether or not a reference sample included in a block encoded by an inter-prediction is unavailable may be determined based on information indicating whether to use a reference sample included in a block encoded by an inter-prediction when performing intra-prediction of a current block. Here, the information may be a 1-bit flag (e.g., 'constrained_intra_prediction_flag'), but is not limited thereto. For example, when a value of 'constrained_intra_prediction_flag' is 1, a reference sample included in a block encoded by an inter-prediction may be determined to be unavailable.

In the example shown in FIG. 16, when it is determined that a reference sample located at left lowermost (e.g., $P(-1, 2N-1)$) is not available, the reference sample located at left lowermost may be replaced with a first available reference sample as it is scanned in a predetermined order. Here, the scanning order may be sequentially performed from a reference sample adjacent to the left lowermost reference sample. For example, in the example shown in FIG. 16, when $P(-1, 2N-1)$ is not available, scanning may be performed in an order of $P(-1, -2N-2)$ to $P(-1, -1)$, $P(-1)$ to $P(2N-1, -1)$. $P(-1, 2N-1)$ may be replaced with a first available reference sample that is found as a result of the scan.

When a left reference sample except for a reference sample located at left lowermost is unavailable, the left reference sample may be replaced with a reference sample adjacent to a bottom of the left reference sample. For example, an unavailable reference sample $P(-1, y)$ between $P(-1, 2N-1)$ and $P(-1, -1)$ may be replaced with a reference sample $P(-1, y+1)$.

When a top reference sample is unavailable, the top reference sample may be replaced with a reference sample adjacent to a left of the top reference sample. For example, an unavailable reference sample $P(x, -1)$ between $P(0, -1)$ and $P(2N-1, -1)$ may be replaced with a reference sample $P(x-1, -1)$.

A reference sample set adjacent to a current block may be referred to as a 'reference line' (or 'intra-reference line' or 'reference sample line'). For example, in the example shown in FIG. 16, a 'reference line' a reference sample set including $P(-1, 2N-1)$ to $P(-1, 1)$, $P(0, -1)$ to $P(2N-2, -1)$. An intra-prediction of a current block may be performed based on reference samples included in a reference line. An intra-prediction of a current block may be performed, using reference samples included in a reference line, based on an intra-prediction mode of a current block, For example, when an intra-prediction mode of a current block is a DC mode, a prediction signal may be generated using an average and weighted prediction of reference samples included in the reference line. For example, when an intra-prediction mode of a current block is a DC mode, prediction samples of the current block may be obtained according to Equation 9.

$$P(0,0)=(P(-1,0)+P(0,-1)+2*\text{dcVal})>>2$$

$$P(x,0)=(P(x,-1)+3*\text{dcVal})>>2$$

$$P(0,y)=(P(-1,y)+3*\text{dcVal})>>2 \quad \text{[Equation 9]}$$

In Equation 9, dcVal may be generated based on an average value of samples except for $P(-1, -1)$ among reference samples included in a reference line.

A planar mode provides effective prediction efficiency in a smooth area having no strong edges, and is effective in improving discontinuity of block boundary or image quality deterioration of a block boundary. When an intra-prediction mode of a current block is a planar mode, a horizontal direction provisional prediction sample of the current block may be obtained using a reference sample adjacent to a top right corner of the current block and a reference sample having y coordinate identical to the horizontal direction provisional prediction sample, and a vertical direction provisional prediction sample of the current block may be obtained using a reference sample adjacent to a bottom left corner of the current block and a reference sample having x coordinate identical to the vertical direction provisional prediction sample. For example, a horizontal direction provisional prediction sample and a vertical direction provisional prediction sample of a current block may be obtained by according to Equation 10.

$$P_h(x,y)=(N-1-x)*P(-1,y)+(x+1)*P(N,-1)$$

$$P_v(x,y)=(N-1-y)*P(x,-1)+(y+1)*P(-1,N) \quad \text{[Equation 10]}$$

A prediction sample of a current block may be generated by summing a horizontal direction provisional prediction sample and a vertical direction provisional prediction sample, and then shifting the summation result by a value determined according to a size of a current block. For example, a prediction sample of a current block may be obtained according to Equation 11.

$$P(x,y)=(P_h(x,y)+P_v(x,y)+N)>>(\log 2(N)+1) \quad \text{[Equation 11]}$$

An intra-prediction of a current block may be performed using a plurality of reference lines. Assuming that a current block has a W×H size, M-th reference line may include $p(-M, -M)$, reference samples located in a row identical to $p(-M, -M)$ (e.g., reference samples from $p(M+1, -M)$ to $p(W+H+2(M-1), -M)$ or reference samples from $p(-M+1, -M)$ to $p(2W+2(M-1), -M)$ and reference samples located in a column identical to $p(-M, -M)$ (e.g., reference samples from p(−M, −M+1) to p(−M, W+H+2(M−1)) or reference samples from p(−M, −M+1) to p(−M, 2H+2(M−1))).

Figure 26:
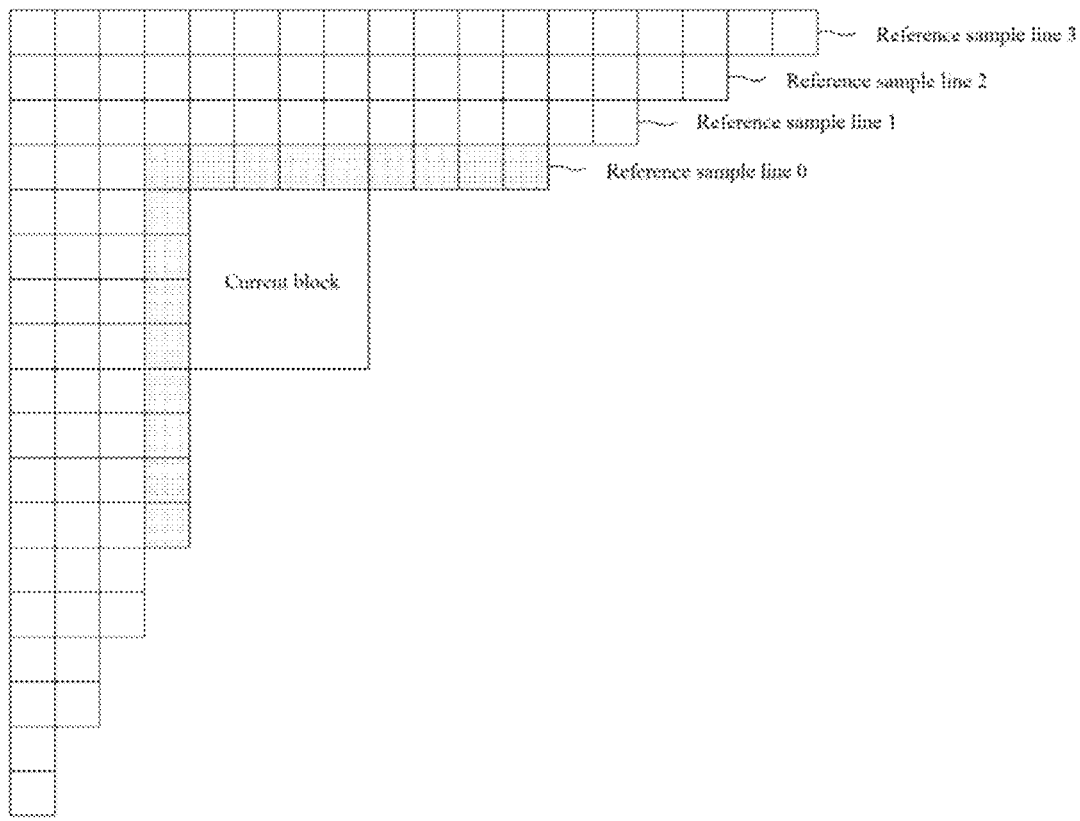
FIG. 26 exemplifies a plurality of reference sample lines.

For example, FIG. 26 exemplifies a plurality of reference sample lines. As in the example shown in FIG. 26, when a first reference line adjacent to a boundary of a current block is referred to as a 'reference line 0', M-th reference line may be set adjacent to (M−1)-th reference line.

An intra-prediction of a current block may be performed by at least one of a plurality of reference lines. A method of performing intra-prediction using a plurality of reference lines as described above may be referred to as an 'intra-prediction method using an extended reference sample' or an 'extended intra-prediction method.'

Whether or not performing intra-prediction using an extended reference line may be determined based on information signaled through a bitstream. Here, the information may be a 1-bit flag, but is not limited thereto. Information on whether performing intra-prediction using an extended reference line may be signaled in units of a coding tree unit, an encoding unit or a prediction unit, or may be signaled in units of a picture or a slice.

Whether or not performing intra-prediction using an extended reference line may be determined based on at least one of a size, shape, depth or intra-prediction mode of a current block.

When it is determined to perform intra-prediction using an extended reference line, a decoder may determine a number of reference lines. Here, a number of reference lines may have a fixed value, and may be adaptively determined according to a size, shape or intra-prediction mode of a current block. For example, when an intra-prediction mode of a current block is a non-directional mode, intra-prediction of the current block is performed using one reference line. When an intra-prediction mode of a current block is a directional mode, intra-prediction of the current block may be performed using a plurality of reference lines.

For an additional example, a number of reference lines may be determined by information that is signaled in units of a sequence, a picture, a slice or a unit to be decoded. For example, a syntax element 'max_intra_line_idx' indicating a number of reference lines available in a sequence or a slice may be signaled through a sequence header or a slice header.

Hereinafter, a method of performing intra-prediction using an extended reference line will be described in detail.

Figure 27:
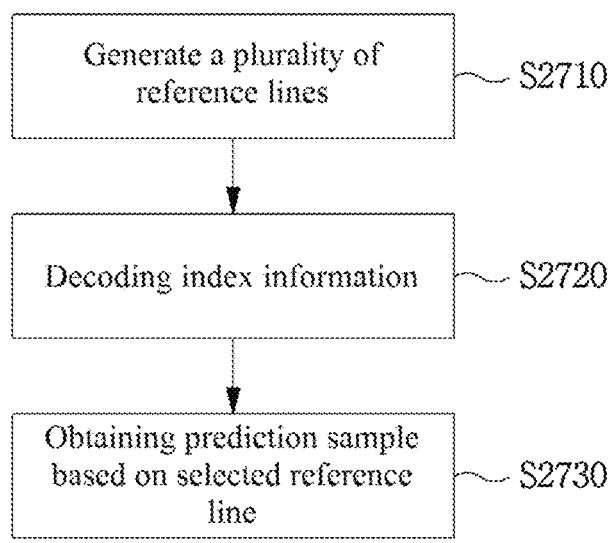
FIG. 27 is a flowchart illustrating a method of performing intra-prediction, using an extended reference line, according to the present invention.

FIG. 27 is a flowchart illustrating a method of performing intra-prediction using an extended reference line according to the present invention.

First, a decoder may generate a plurality of reference lines (S2710). Reference samples included in each reference line may be generated based on reconstructed samples included in blocks decoded earlier than a current block. When an unavailable reference sample is included in a reference line, the unavailable reference sample may be replaced with a value of an available reference sample in the same reference line or an available reference sample in another reference line.

When an intra-prediction mode of a current block is a directional mode, a decoder may generate a reference line considering a directionality of the intra-prediction mode. Considering a directionality of an intra-prediction mode, a larger number of reference samples may be included in M-th reference line than in (M−1)-th reference line. That is, a reference line away from a current block may include a larger number of reference samples than a reference line near the current block.

Here, a number of reference samples further included in M-th reference line than in (M−1)-th reference line may be variably determined according to a size of a current block.

For example, when a current block has a 4×4 size, M-th reference line may further include four (specifically, 2 in horizontal direction and 2 in vertical direction) reference samples than (M−1)-th reference line. In addition, when a current block has a size of 8×8, M-th reference line may further include eight (specifically, 4 in horizontal direction and 4 in vertical direction) reference samples than (M−1)-th reference line.

Referring to FIG. 26, as a size of a current block size is 4×4, it is exemplified that a first reference sample includes a total of 9 reference samples and a second reference sample includes a total of 13 (=9+2×2) reference samples.

When a current block is non-square, a number of reference samples included in a reference line may be determined according to a horizontal and vertical lengths of a current block.

Figure 28:
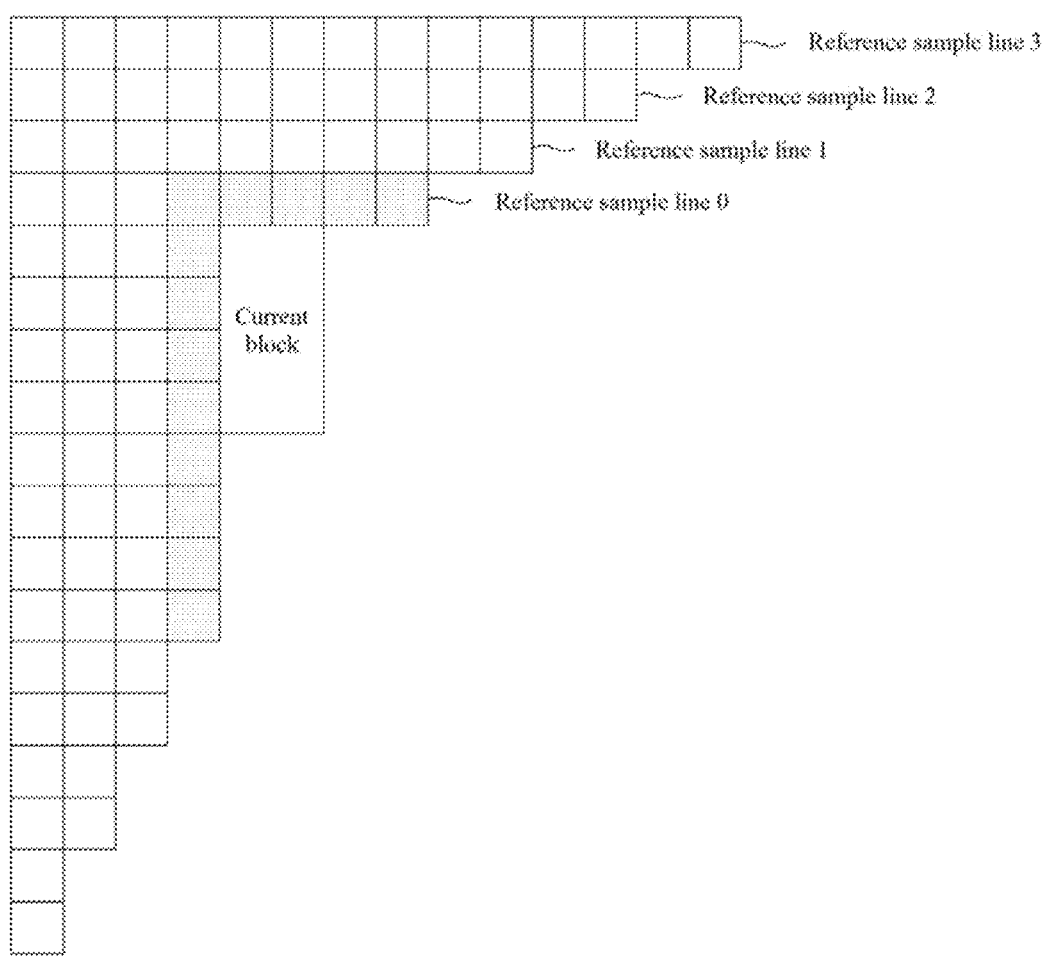
FIG. 28 is a diagram exemplifying a plurality of reference lines for a non-square block.

For an example, FIG. 28 is a diagram exemplifying a plurality of reference lines for a non-square block. Describing with comparing FIGS. 26 and 28, as a width of a current block decreases to ½, a number of top reference samples except for a top left reference sample included in a reference line 0 is reduced from 8 to 4.

That is, considering FIGS. 26 and 28 together, when assuming that a current block has a W×H size, M-th reference line may include a total of 2{(W+H)+2(M−1)}+1 reference samples including W+H+2(M−1) top reference samples (or 2W+2(M−1) top reference samples) (i.e., horizontal direction reference samples), W+H+2(M−1) left reference samples (or 2H+2(M−1) left reference samples) (i.e., vertical direction reference samples) and top left reference sample.

A decoder may decode, based on a bitstream, index information specifying one of a plurality of reference lines (S2820). For example, when 4 reference lines are available as in the example shown in FIG. 26, index information may specify any one of the 4 reference lines.

A reference line for performing intra-prediction for a current block may be adaptively specified based on a size of a current block, a type of a current block, an intra-prediction mode of a current block, index information in a neighboring block or a difference between an intra-prediction mode of a current block and a predetermined intra-prediction mode, and the like.

When any one of a plurality of reference lines is specified, a decoder may perform intra-prediction for a current block using the specified reference line (S2730). When an intra-prediction mode of a current block is a directional mode, a prediction sample of the current block may be obtained by a reference sample specified by the directional mode. When an intra-prediction mode of a current block points between reference samples, a prediction sample of the current block may be generated based on a weighted sum (weighted prediction) of a first reference sample and a second reference sample specified by the intra-prediction mode.

In the example described above, it is exemplified that index information specifying one of the plurality of reference lines is decoded after generating a plurality of reference lines. It is also possible to obtain only a reference line specified by index information among a plurality of reference lines after decoding the index information specifying one of the plurality of reference lines.

In the embodiment described above, it is described that intra-prediction for a current block is performed using any one reference line specified by index information among a plurality of reference lines. It is also possible that intra-prediction for a current block may be performed using two or more reference lines among a plurality of reference lines. Whether or not to use two or more reference lines in performing intra-prediction for a current block may be determined based on information signaled from a bitstream, a size of a current block, a type of a current block, an intra-prediction mode of a current block, whether an intra-prediction mode of a current block is a non-directional or a difference between an intra-prediction mode of a current block and a predetermined intra-prediction mode, and the like.

The two or more reference lines may be specified by a plurality of index information signaled from a bitstream. For example, when two reference lines are set to be used, any one of the two reference lines may be specified by first index information, and the other may be specified by second index information.

For an additional example, intra-prediction for a current block may be set to use two or more spatially contiguous reference lines. In this case, when any one of the two or more reference lines is specified by index information signaled from a bitstream, the remaining reference line may be specified in consideration of position with respect to the specified reference line. For example, when it is set to use two reference lines, and index information indicates 'reference line 0,' then intra-prediction of a current block may be performed based on reference line 0 and reference line 1 neighboring the reference line 0.

When it is set to use a plurality of reference lines, intra-prediction of a current block may be performed based on an average value, a maximum value, a minimum value or a weighted sum of reference samples included in the plurality of reference lines.

For example, assuming that an intra-prediction mode of a current block is a directional mode (i.e., an Angular mode), a predicted sample of the current block may be generated based on a first reference sample and a second reference sample neighboring the first reference sample. Here, a first reference sample may be included in a first reference line among a plurality of reference lines, and a second reference sample may be included in a second reference line among the plurality of reference lines. A first reference line and a second reference line may be positioned neighboring each other, but it is not limited thereto. A first reference sample and a second reference sample may be specified according to a directionality of an intra-prediction mode of a current block. A prediction sample of a current block may be generated in consideration of a weighted sum of a first reference sample and a second reference sample, or may be generated based on an average value of a first reference sample and a second reference sample.

Intra-prediction of a current block may be performed by performing a first intra-prediction based on a part of a plurality of reference lines and performing a second intra-prediction based on the remaining reference lines. Here, an intra-prediction mode used in a first intra-prediction and an intra-prediction mode used in a second intra-prediction may be the same or different. A prediction sample of a current block may be generated based on a first prediction sample generated by performing a first intra-prediction and a second prediction sample generated by performing a second intra-prediction.

Above embodiments have been described mainly on decoding process, encoding process may be performed in the same order as described or in reverse order.

Although the above-described embodiments have been described on the basis of a series of steps or flowcharts, they do not limit the time-series order of the invention, and may be performed simultaneously or in different orders as necessary. Further, each of the components (for example, units, modules, etc.) constituting the block diagram in the above-described embodiments may be implemented by a hardware device or software, and a plurality of components. Or a plurality of components may be combined and implemented by a single hardware device or software. The above-described embodiments may be implemented in the form of program instructions that may be executed through various computer components and recorded in a computer-readable recording medium. The computer-readable recording medium may include one of or combination of program commands, data files, data structures, and the like. Examples of computer-readable media include magnetic media such as hard disks, floppy disks and magnetic tape, optical recording media such as CD-ROMs and DVDs, magneto-optical media such as floptical disks, media, and hardware devices specifically configured to store and execute program instructions such as ROM, RAM, flash memory, and the like. The hardware device may be configured to operate as one or more software modules for performing the process according to the present invention, and vice versa.

INDUSTRIAL APPLICABILITY

The present invention may be applied to electronic devices which is able to encode/decode a video.

The invention claimed is:
1. A method for decoding a video, the method comprising:
determining a reference sample line of a current block by selecting one among a neighboring reference sample line adjacent to the current block and non-neighboring reference sample lines not adjacent to the current block;
determining an intra-prediction mode of the current block; and
performing intra-prediction for the current block based on the intra-prediction mode and reference samples included in the reference sample line of the current block,
wherein determining the intra-prediction mode of the current block comprises:
decoding a first flag and a second flag from a bitstream, each of the first flag and the second flag having 1-bit length,
determining, based on the first flag, whether the intra-prediction mode of the current block is identical to a first candidate intra-prediction mode in a first candidate list,
when the first flag indicates that the intra-prediction mode of the current block is not identical to the first candidate intra-prediction mode while the second flag indicates that the intra-prediction mode of the current block is identical to one of the candidate intra prediction modes, decoding an index information specifying one of candidate intra-prediction modes included in a second candidate list, and
determining the intra-prediction mode of the current block based on a candidate intra-prediction mode specified by the index information,
wherein when it is determined that none of the candidate intra-prediction modes is identical to the intra-prediction mode of the current block, determining the intra-prediction mode of the current block comprises:

decoding a remaining mode, and deriving the intra-prediction mode of the current block by comparing the decoded remaining mode with a candidate intra-prediction mode, wherein a planar mode is included in the first candidate list as the first candidate intra-prediction mode, and the second candidate list is constituted without comprising the planar mode, wherein at least one of the candidate intra-prediction modes is derived based on a second intra-prediction mode of a neighboring block adjacent to the current block, wherein when a second intra prediction scheme is applied to the neighboring block while a first intra prediction scheme is applied to a current block, the at least one of the candidate intra-prediction modes is derived by using a predetermined intra-prediction mode, wherein the number of intra-prediction modes defined under the first intra prediction scheme is different from the number of intra-prediction modes defined under the second intra prediction scheme, wherein, under a non-directional intra prediction mode of a Planar or a DC, the intra prediction for the current block is performed by using only the neighboring reference sample line but cannot be performed by using any one among the non-neighboring reference sample lines, and wherein under another intra prediction mode different from the non-directional intra prediction mode, the intra prediction for the current block is performed by using any one among the neighboring reference sample line and the non-neighboring reference sample lines.

2. The method according to claim 1, wherein the second candidate list comprises a candidate intra-prediction mode derived by adding or subtracting an offset from a maximum among intra-prediction modes of a left neighboring block and a top neighboring block.

3. The method according to claim 1, wherein when the decoded remaining mode is equal to or greater than the candidate intra-prediction mode, the intra-prediction mode of the current block is derived by adding 1 to the decoded remaining mode.

4. The method according to claim 3, wherein the remaining mode is encoded as a fixed length.

5. A method for encoding a video, the method comprising:

determining a reference sample line of a current block by selecting one among a neighboring reference sample line adjacent to the current block and non-neighboring reference sample lines not adjacent to the current block;

determining an intra-prediction mode of the current block; and performing intra-prediction for the current block based on the intra-prediction mode and reference samples included in the reference sample line of the current block, wherein determining the intra-prediction mode of the current block comprises:

encoding a first flag and a second flag into a bitstream, each of the first flag and the second flag having 1-bit length, the first flag being encoded based on whether the intra-prediction mode of the current block is identical to a first candidate intra-prediction mode in a first candidate list, and when it is determined that the intra-prediction mode of the current block is not equal to the first candidate intra-prediction mode in the first candidate list while it is determined that one of candidate intra-prediction modes is identical to the intra-prediction mode of the current block, encoding index information specifying one identical to the intra-prediction mode of the current block among candidate intra-prediction modes in a second candidate list; and wherein when it is determined that none of the candidate intra-prediction modes is identical to the intra-prediction mode of the current block, determining the intra-prediction mode of the current block comprises:

remapping remaining modes by comparing the intra-prediction mode of the current block with a candidate intra-prediction mode, and encoding a remaining mode corresponding to the intra-prediction mode of the current block, wherein a planar mode is included in the first candidate list as the first candidate intra-prediction mode, and the second candidate list is constituted without comprising the planar mode, wherein at least one of the candidate intra-prediction modes is derived based on a second intra-prediction mode of a neighboring block adjacent to the current block, wherein when a second intra prediction scheme is applied to the neighboring block while a first intra prediction scheme is applied to a current block, the at least one of the candidate intra-prediction modes is derived by using a predetermined intra-prediction mode, wherein the number of intra-prediction modes defined under the first intra prediction scheme is different from the number of intra-prediction modes defined under the second intra prediction scheme, wherein, under a non-directional intra prediction mode of a Planar or a DC, the intra prediction for the current block is performed by using only the neighboring reference sample line but cannot be performed by using any one among the non-neighboring reference sample lines, and wherein under another intra prediction mode different from the non-directional intra prediction mode, the intra prediction for the current block is performed by using any one among the neighboring reference sample line and the non-neighboring reference sample lines.

6. The method according to claim 5, wherein the second candidate list comprises a candidate intra-prediction mode derived by adding or subtracting an offset from a maximum among intra-prediction modes of a left neighboring block and a top neighboring block.

7. An apparatus for decoding a video, the apparatus comprising:

one or more processors configured to:

a decoding unit to decode a first flag and a second flag from a bitstream, each of the first flag and the second flag having 1-bit length; and an intra-prediction unit to determine a reference sample line of a current block by selecting one among a neighboring reference sample line adjacent to the current block and non-neighboring reference sample lines not adjacent to the current block, to determine the intra-prediction mode of the current block, and to perform intra-prediction for the current block based on the intra-prediction mode and reference samples included in the reference sample line of the current block, wherein the intra-prediction unit is further configured to:
determine, based on the first flag, whether the intra-prediction mode of the current block is identical to a first candidate intra-prediction mode in a first candidate list, and
when the first flag indicates that the intra-prediction mode of the current block is not identical to the first candidate intra-prediction mode while the second flag indicates that the intra-prediction mode of the current block is identical to one of the candidate intra prediction modes, determining the intra-prediction mode of the current block based on index information specifying one of candidate intra-prediction modes included in a second candidate list,
wherein when it is determined that none of the candidate intra-prediction modes is identical to the intra-prediction mode of the current block, the intra-prediction unit is further configured to determine the intra-prediction mode of the current block by comparing a remaining mode with a candidate intra-prediction mode, the remaining mode being parsed from a bitstream,
wherein a planar mode is included in the first candidate list as the first candidate intra-prediction mode, and the second candidate list is constituted without comprising a candidate intra-prediction mode of the planar mode,
wherein at least one of the candidate intra-prediction modes is derived based on a second intra-prediction mode of a neighboring block adjacent to the current block,
wherein when a second intra prediction scheme is applied to the neighboring block while a first intra prediction scheme is applied to a current block, the at least one of the candidate intra-prediction modes is derived by using a predetermined intra-prediction mode,
wherein the number of intra-prediction modes defined under the first intra prediction scheme is different from the number of intra-prediction modes defined under the second intra prediction scheme,
wherein, under a non-directional intra prediction mode of a Planar or a DC, the intra prediction for the current block is performed by using only the neighboring reference sample line but cannot be performed by using any one among the non-neighboring reference sample lines, and
wherein under another intra prediction mode different from the non-directional intra prediction mode, the intra prediction for the current block is performed by using any one among the neighboring reference sample line and the non-neighboring reference sample lines is utilizable as the reference sample line of the current block.

8. A non-transitory computer-readable medium for storing data associated with a video signal, comprising:
a data stream stored in the non-transitory computer-readable medium, the data stream being decoded by a decoding method which comprising:
determining a reference sample line of a current block by selecting one among a neighboring reference sample line adjacent to the current block and non-neighboring reference sample lines not adjacent to the current block;
determining an intra-prediction mode of the current block; and
performing intra-prediction for the current block based on the intra-prediction mode and reference samples included in the reference sample line of the current block, wherein determining the intra-prediction mode of the current block comprises:
decoding a first flag and a second flag from a bitstream, each of the first flag and the second flag having 1-bit length,
determining, based on the first flag, whether the intra-prediction mode of the current block is identical to a first candidate intra-prediction mode in a first candidate list,
when the first flag indicates that the intra-prediction mode of the current block is not identical to the first candidate intra-prediction mode while the second flag indicates that the intra-prediction mode of the current block is identical to one of candidate intra prediction modes, decoding an index information specifying one of candidate intra-prediction modes included in a second candidate list, and
determining the intra-prediction mode of the current block based on a candidate intra-prediction mode specified by the index information,
wherein when it is determined that none of the candidate intra-prediction modes is identical to the intra-prediction mode of the current block, determining the intra-prediction mode of the current block comprises:
decoding a remaining mode, and
deriving the intra-prediction mode of the current block by comparing the decoded remaining mode with a candidate intra-prediction mode,
wherein a planar mode is included in the first candidate list as the first candidate intra-prediction mode, and the second candidate list is constituted without comprising the planar mode,
wherein at least one of the candidate intra-prediction modes is derived based on a second intra-prediction mode of a neighboring block adjacent to the current block,
wherein when a second intra prediction scheme is applied to the neighboring block while a first intra prediction scheme is applied to a current block, the at least one of the candidate intra-prediction modes is derived by using a predetermined intra-prediction mode,
wherein the number of intra-prediction modes defined under the first intra prediction scheme is different from the number of intra-prediction modes defined under the second intra prediction scheme,
wherein, under a non-directional intra prediction mode of a Planar or a DC, the intra prediction for the current block is performed by using only the neighboring reference sample line but cannot be performed by using any one among the non-neighboring reference sample lines, and
wherein under another intra prediction mode different from the non-directional intra prediction mode, the intra prediction for the current block is performed by using any one among the neighboring reference sample line and the non-neighboring reference sample lines is utilizable as the reference sample line of the current block.

9. The method of claim 1, wherein, under a case that the current block is partitioned into a plurality of partitions, the intra prediction for the current block is performed by using only the neighboring reference sample line but cannot be performed by using any one among the non-neighboring reference sample lines, and
wherein, under a case that the current block is not partitioned into the plurality of partitions, the intra prediction for the current block is performed by using any one among the neighboring reference sample line and the non-neighboring reference sample lines.

10. The method of claim 9, wherein when it is determined to partition the current block into the plurality of partitions, the number of partitions is adaptively determined as two or four based on a size of the current block.

11. The method of claim 1, wherein the number of candidate reference sample lines is determined based on information signaled via a sequence parameter set.

12. The method of claim 1, wherein the method further comprises determining whether to modify prediction samples included in the current block generated by the intra prediction, and wherein when it is determined to modify the prediction samples, whether each of the prediction samples is modified or not is determined based on a position thereof.

13. The method of claim 12, wherein modifying the prediction sample is performed by using an offset derived based on a neighboring sample, and wherein a weight applied to the offset is proportional or inverse-proportional to a distance from a boundary of the current block to the prediction sample.

* * * * *

UNITED STATES PATENT AND TRADEMARK OFFICE
CERTIFICATE OF CORRECTION

| | | |
|---|---|---|
| PATENT NO. | : 11,259,047 B2 | Page 1 of 1 |
| APPLICATION NO. | : 16/091904 | |
| DATED | : February 22, 2022 | |
| INVENTOR(S) | : Bae Keun Lee and Joo Young Kim | |

It is certified that error appears in the above-identified patent and that said Letters Patent is hereby corrected as shown below:

In the Claims

In Claim 7, Column 43, Lines 50-52, "is utilizable as the reference sample line of the current block" should be deleted.

In Claim 8, Column 44, Lines 56-58, "is utilizable as the reference sample line of the current block" should be deleted.

Signed and Sealed this
Twenty-eighth Day of October, 2025

John A. Squires
*Director of the United States Patent and Trademark Office*